(12) United States Patent
Rhyu et al.

(10) Patent No.: US 12,200,036 B2
(45) Date of Patent: Jan. 14, 2025

(54) APPARATUS AND METHOD FOR PROVIDING MEDIA STREAMING

(71) Applicant: SAMSUNG ELECTRONICS CO., LTD., Suwon-si (KR)

(72) Inventors: Sungryeul Rhyu, Suwon-si (KR); Hyunkoo Yang, Suwon-si (KR); Hakju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 17/657,082

(22) Filed: Mar. 29, 2022

(65) Prior Publication Data
US 2022/0321628 A1    Oct. 6, 2022

(30) Foreign Application Priority Data
Mar. 30, 2021 (KR) .................. 10-2021-0040931

(51) Int. Cl.
| | | |
|---|---|---|
| G06F 15/16 | (2006.01) | |
| G06F 3/01 | (2006.01) | |
| H04L 65/403 | (2022.01) | |
| H04L 65/4061 | (2022.01) | |
| H04L 65/60 | (2022.01) | |

(Continued)

(52) U.S. Cl.
CPC .............. *H04L 65/70* (2022.05); *G06F 3/011* (2013.01); *H04L 65/403* (2013.01); *H04L 65/4061* (2013.01); *H04L 65/60* (2013.01); *H04L 65/61* (2022.05)

(58) Field of Classification Search
CPC ....... H04L 65/70; H04L 65/61; H04L 65/403; H04L 65/4061; H04L 65/60; G06F 3/011

USPC .................................................. 709/203, 231
See application file for complete search history.

(56) References Cited

U.S. PATENT DOCUMENTS

| | | | | |
|---|---|---|---|---|
| 2010/0156916 A1* | 6/2010 | Muikaichi | .......... | H04N 21/4728 345/536 |
| 2014/0140391 A1* | 5/2014 | Eshima | .................. | H04N 19/85 375/240.01 |
| 2018/0018782 A1 | 1/2018 | Menozzi | | |

(Continued)

FOREIGN PATENT DOCUMENTS

| | | |
|---|---|---|
| WO | 2019204638 A1 | 10/2019 |
| WO | 2020234373 A1 | 11/2020 |

OTHER PUBLICATIONS

International Search Report and Written Opinion of the International Searching Authority dated Jun. 28, 2022, in connection with International Application No. PCT/KR2022/004454, 7 pages.

(Continued)

*Primary Examiner* — Duyen M Doan

(57) ABSTRACT

A method for providing a media stream to a user equipment (UE) by a server apparatus may include: receiving, from a content provider, the media stream to be provided to the UE, and storing the same; rendering an image of the stored media stream; generating, as a frame, the rendered image and instruction information relating to the rendered image; and encoding the generated frame to transmit the same to the UE through a network, wherein the instruction information instructs at least one of storage, reuse, and a report request of the transmitted image, an update of a pre-stored image, and deletion of the pre-registered image.

18 Claims, 18 Drawing Sheets

(51) Int. Cl.
*H04L 65/61* (2022.01)
*H04L 65/70* (2022.01)

(56) References Cited

U.S. PATENT DOCUMENTS

| | | | |
|---|---|---|---|
| 2018/0091791 A1 | 3/2018 | Jiang et al. | |
| 2018/0270531 A1* | 9/2018 | Ye | H04L 43/16 |
| 2019/0037244 A1 | 1/2019 | Krishnaprasad et al. | |
| 2019/0050149 A1 | 2/2019 | Ozguner et al. | |
| 2019/0246127 A1* | 8/2019 | Chen | G02B 27/01 |
| 2020/0410953 A1 | 12/2020 | Wagner et al. | |
| 2021/0027752 A1 | 1/2021 | Holmes et al. | |
| 2021/0192701 A1* | 6/2021 | Jie | G06N 3/047 |
| 2021/0304448 A1* | 9/2021 | Smith | G06T 11/00 |

OTHER PUBLICATIONS

3GPP TS 26.501 V16.5.0 (Sep. 2020) Technical Specification; 3rd Generation Partnership Project; Technical Specification Group Services and System Aspects; 5G Media Streaming (5GMS); General description and architecture (Release 16), 77 pages.

Supplementary European Search Report dated May 29, 2024, in connection with European Patent Application No. 22781584.2, 8 pages.

3GPP TS 26.501 V16.6.1 (Jan. 2021) Technical Specification; 3rd Generation Partnership Project; Technical Specification Group Services and System Aspects; 5G Media Streaming (5GMS); General description and architecture (Release 16), 79 pages.

* cited by examiner

APPARATUS AND METHOD FOR PROVIDING MEDIA STREAMING

CROSS-REFERENCE TO RELATED APPLICATION

This application is based on and claims priority under 35 U.S.C. § 119 to Korean Patent Application No. 10-2021-0040931, filed on Mar. 30, 2021, in the Korean Intellectual Property Office, the disclosure of which is herein incorporated by reference in its entirety.

BACKGROUND

1. Field

The present disclosure relates to an apparatus and a method for providing media streaming and, more specifically, to an apparatus and a method for providing high-definition media streaming.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices may exponentially grow. Increasingly, these may be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, may have a peak data rate of tera (1,000 giga)-level bps and a radio latency less than 100 μsec, and thus may be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) may become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), may allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response may be provided through the 6G communication system such that the technologies could be applied in various fields such as industry, medical care, automobiles, and home appliances.

A 5G communication system or a 6G communication system may provide media streaming data (or service) including various images and sounds (or music) to a device receiving a service, for example, a user equipment (UE). A content provider may provide media streaming data to the user equipment by using a specific application server for providing the media streaming data (or service). In this case, an application server is a network for providing the media streaming data and may use the 5G communication system or the 6G communication system. Alternatively, to provide the media streaming data, the application server may use a wired network or another wireless communication network, for example, Wi-Fi.

In addition, there may be various types of streaming data. For example, there is media stream data such as drama, movie, and music, transmitted regardless of a user's location, movement, motion, or the like. In another example, in a case of augmented reality (AR), virtual reality (VR), a game, etc., the media streaming data needs to be provided based on a user's motion, for example, a movement, a motion, a pose, and the like.

When providing the media streaming data such as AR, VR, and game, a content having a very high definition needs to be provided. Accordingly, to process such information, transmission needs to be performed through a network, which increases the amount of data and requires a UE with very high performance. Specifically, in a case of media stream data such as AR, VR, and game, very low latency is required.

The above information is presented as background information only to assist with an understanding of the disclosure. No determination has been made, and no assertion is made, as to whether any of the above may be applicable as prior art with regard to the disclosure.

SUMMARY

However, there is a problem in that currently it is difficult to provide media streaming data satisfying all requirements. In addition, media streaming data, such as AR, VR, and games, needs to adaptively provide a content with a very high definition, based on a motion of a user, and thus, a device with very high performance is required. This consequently requires a very expensive device, which may cause an obstructive factor in commercialization of media stream service of AR, VR, and game.

Accordingly, the disclosure provides an apparatus and a method for providing low-latency media streaming service.

In addition, the disclosure provides an apparatus and a method for providing low latency media streaming service through a device with lower performance.

A method according to an embodiment of the disclosure corresponds to a method for providing a media stream to a user equipment (UE) by a server apparatus, and may include: receiving, from a content provider, the media stream to be provided to the UE, and storing the media stream; rendering an image of the stored media stream; generating a first frame including the rendered image and instruction information relating to the rendered image; encoding the first frame; transmitting the encoded first frame to the UE through a network, wherein the instruction information instructs at least one of storage, reuse, and a report request of the transmitted image, an update of a pre-stored image, and deletion of the pre-registered image.

A device according to an embodiment of the disclosure corresponds to a server apparatus for providing a media stream to a user equipment (UE), and may include: a database configured to store a rendered image and a media stream content received from a content provider to be provided to the UE, according to a mapping rule; a media stream encoder configured to encode the media stream content to transmit the same to the UE through a network; and at least one processor includes: a renderer configured to render an image of a media stream stored in the database; an instruction processor configured to generate instruction information for the rendered image; and a frame generator configured to generate a first frame including the rendered image and the instruction information, and the instruction information instructs at least one of storage, reuse, and a report request of the transmitted image, an update of a pre-stored image, and deletion of the pre-registered image.

Through application of the apparatus and the method according to the disclosure, high-quality media streaming service can be seamlessly provided with low latency even in a device having low performance.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
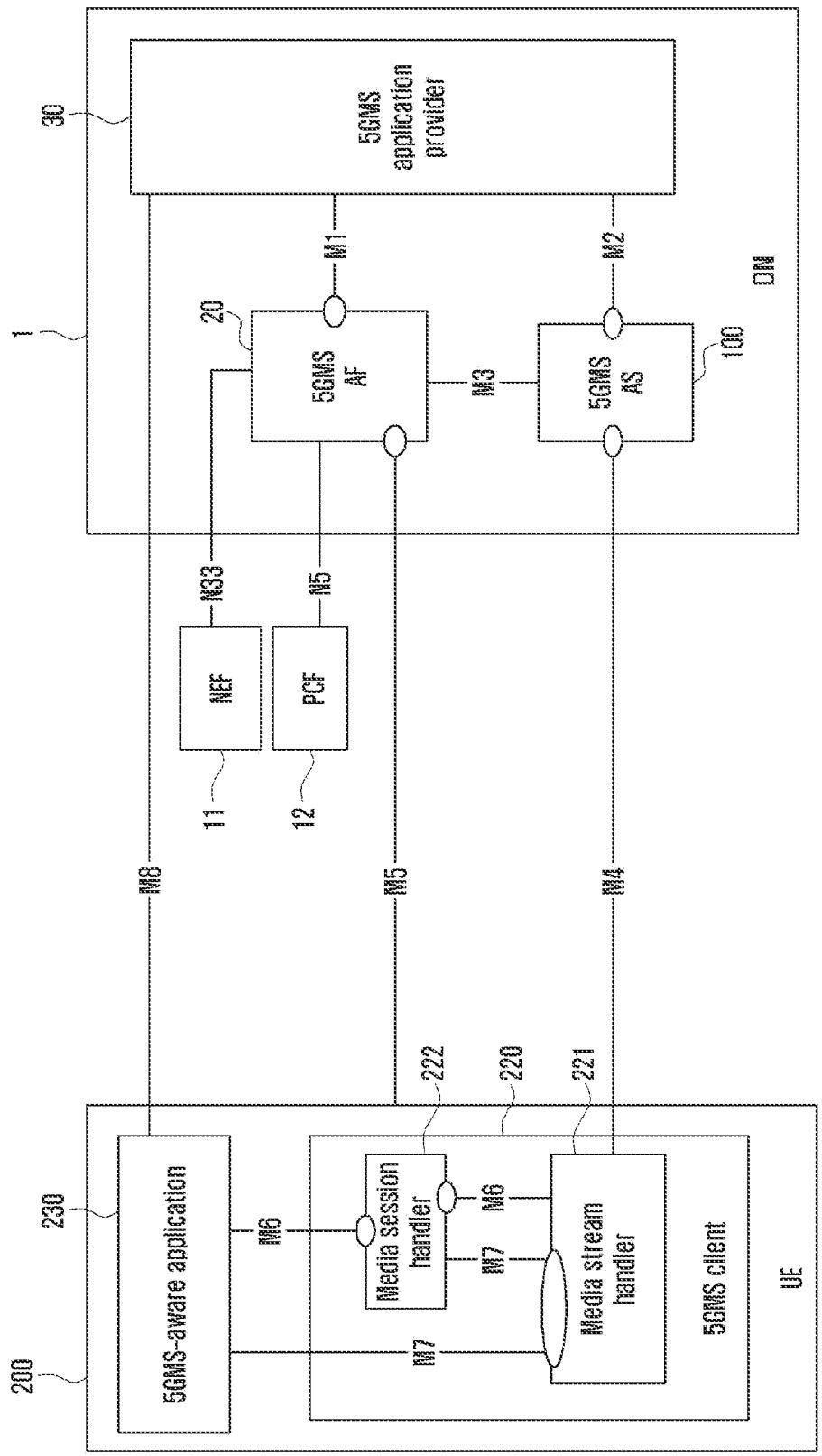
FIG. 1A illustrates an example of an architecture for providing media stream service according to various embodiments of the present disclosure.

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described in detail with reference to the accompanying drawings. It should be noted that in the accompanying drawings, the same or like elements are designated by the same or like reference numerals. Further, it should be noted that the following accompanying drawings of the disclosure are provided to help understanding of the disclosure and the disclosure is not limited to configurations or arrangements illustrated in the drawings of the disclosure. In addition, it should be noted that in the following description of the disclosure, only parts necessary for understanding operations according to various embodiments of the disclosure will be described and descriptions of the other parts will be omitted so as not to make the subject matter of the disclosure obscure.

FIG. 1A illustrates an example of an architecture for providing media stream service according to various embodiments of the present disclosure.

FIG. 1A shows an architecture described in a standard document for 5G media streaming (5GMS) of 3GPP TS 26.501. Elements in FIG. 1A are simply described below.

Referring to FIG. 1A, a data network (DN) 1 may include a 5GMS application provider 30, a 5GMS application function (5GMS AF) device 20, and a 5GMS application server 100.

The 5GMS application provider 30 may be a system for providing media stream service in a 5GMS system. For example, the 5GMS application provider 30 may be a service provider which can provide broadcasting service, specific game service, AR service, and/or VR service. The 5GMS application provider 30 may provide media stream service to the 5GMS application server 100 through an M2 interface. In addition, the 5GMS application provider 30 may be connected to the 5GMS application function device 20 through an M1 interface to transmit/receive various control messages.

When the 5GMS application provider 30 provides media service, the 5GMS application function device 20 may be connected to a 5G core network to perform various controls allowing the media service to be provided based on a 5G core network policy. The 5GMS application function device 20 may be directly connected to a policy control function (PCF) device 12 through an N5 interface, or may be connected to a network exposure function (NEF) device 11 through an N33 interface, so as to access each entity in the 5G core network.

The 5GMS application server 100 may be an application server for receiving media stream service to be provided by the 5GMS application provider 30 and providing the service to an actual user equipment (UE) 200. When receiving media stream data from the 5GMS application provider 30, the 5GMS application server 100 may receive metadata of the corresponding media stream. The metadata of the media stream may include content metadata. In addition, when the 5GMS application server 100 provides media stream service to a specific user equipment 200 or when the specific UE 200 requests the media stream service from the 5GMS application server, the 5GMS application server may provide the media stream service to the user equipment 200 through an M4 interface, based on a policy provided by the 5GMS application function device 20, and receive pose information from the user equipment 200.

When receiving the pose information according to the disclosure, the 5GMS application server 100 may generate a rendered image of a content, based on the received pose information, and transmit the same to the user equipment 200 at an appropriate time point. In addition, the generated rendered image may be stored in a specific memory (not shown in FIG. 1A) region in the server. Such a detailed description will be made below with reference to the following drawings. In addition, the 5GMS application server 100 may perform split processing between the server and the user equipment 200 according to the disclosure to be made below. Although not shown in FIG. 1A, the 5GMS application server 100 may transmit media stream through a base station (not shown in FIG. 1A) connected to the 5G core network and the user equipment 200 through a wireless interface.

Next, a configuration of the user equipment 200 is described. The user equipment 200 may include a 5GMS-aware application 230 and a 5GMS client 220. In addition, the 5GMS client 220 may include a media stream handler 221 and a media session handler 222.

The 5GMS-aware application 230 is an application provided by the 5GMS application provided 30 through the 5GMS application server 100 and/or another specific server, and may be an application for providing media stream service to a user in the user equipment 200. In addition, the 5GMS-aware application 230 may receive media stream from the media stream handler 221 through an M7 interface, and perform processing for the received media stream.

The media stream handler 221 included in the 5GMS client 220 may be a receiver for processing media stream data provided from the 5GMS application server 100. The media stream handler 221 may provide information on a state of receiving a current media stream to the media session handler 222 through the M7 interface.

The media session handler 222 included the 5GMS client 220 may perform control for maintenance of a media session together with the 5GMS application function device 20 through an M5 interface. The media session handler 222 may also provide information on a session of the media stream received from the media stream handler 221 to the media stream handler 221 or the 5GMS-aware application 230 through an M6 interface.

Hereinafter, in the disclosure, as described above, the split processing between the server 100 and the user equipment 200 may be applied. Split processing described in the disclosure allows media stream data processing to be performed through a split (division) into some portions between the server 100 and the user equipment 200. For example, in order to provide a user with media streaming data, instead of performing all procedures by the user equipment 200, the server 100 may perform pre-processing for a part of the data and provide the pre-processed data to the user equipment 200 in advance, so as to reduce a load of the user equipment. As an example of the pre-processing operation, a case in which image rendering is performed through split rendering is assumed and described.

For image rendering, the server 100 may include a renderer (not shown in FIG. 1A). In addition, the user equipment 200 may also include a renderer for image processing or an image processor (not shown in FIG. 1A).

Figure 1B:
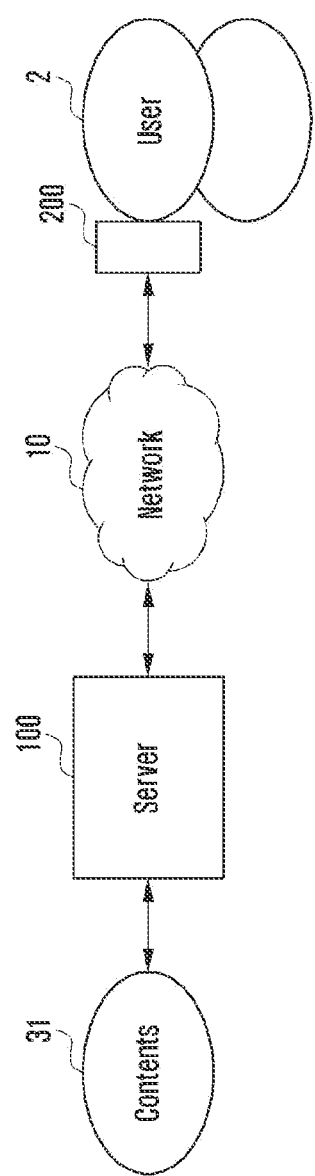
FIG. 1B illustrates an example of a simplified architecture for providing media stream service according to various embodiments of the present disclosure.

A case where the split rendering is required may correspond to a case where a content to be provided is a high capacity content. For example, when a content to be provided is a content 31 as shown in FIG. 1B) having very high definition, i.e., high capacity data, such as an 8K display, augmented reality (AR), virtual reality (VR), and/or a high-definition game, and the user equipment 200 solely processes the same, a very high performance is required for the user equipment 200. In this case, when data requiring a higher performance than that of the user equipment 200 is received from the server 100, the user equipment 200 cannot process the data. Accordingly, when the server 100 according to the disclosure is to process high capacity data, the server may perform rendering of a content image to be transmitted, in advance, based on pose information, received from the user equipment 200, for example, a movement of a user's head, detection of a user's movement, direction shifting of a user, a change in the altitude, etc.

A case where an AR content is provided to the user device 200 is assumed. For the AR content, data transmission may be performed at a high data rate while requiring very low latency due to the characteristics of the content. Accordingly, the server 100 may perform rendering of a part of the image of the content to be transmitted, in advance, based on a user's pose received from the user equipment 200. The rendered image may be pre-stored in the server 100, or may be transmitted to the user equipment 200 at a specific time point. In addition, when there is no change in the shape or color of the provided content, the user equipment 200 may also reuse the previous rendered image to be transmitted. Accordingly, the user equipment 200 may reuse the image received from the server 100, or may use the pre-received image at a specific time point. The user equipment 200 may make a small modification to the image pre-received from the server 100, as necessary, to provide the same to the user.

When the method described above is used, that is, when the user equipment 200 stores a predetermined rendered image, there is a problem in that not all images can be stored due to limited storage spaces of the user equipment 200. In addition, when storing only a part of the received rendered image, the user equipment 200 may have difficulty in identifying an image to be stored. This is because, to pre-store an image, an image to be stored may be determined through processing of a complex algorithm, which leads to a high load when the processing is performed in a processor of the user equipment 200.

In addition, the user equipment 200 normally does not have the optimal rendered image corresponding to a pose of the user, and there is no basis for identifying whether the received rendered image is optimal with respect to a user input. Furthermore, the server 100 normally assumes that the user equipment 200 does not store a rendered image. Even though the user equipment 200 has a rendered image stored, no method of informing the server 100 of the same is presented. Accordingly, according to the description made so far, the server 100 may always provide all rendered images to the user equipment 200. There is no advantage in terms of data transmission even through the user equipment 200 stores a specific rendered image. In addition, even though split rendering is performed between the server 100 and the user equipment 200, there is not information shared between the server and the user equipment due to the problem mentioned above, and no effect of split rendering is thus expected.

In this perspective, there is a problem in that the user equipment 200 is not able to aware of a geometric form of a rendered image provided by the server 100. In other words, for an image having geometric characteristics, for example, a content image having characteristic such as unevenness, a hole, and transparency, there may be a large discrepancy between an image rendered regardless of a user input and an image rendered based on pose information corresponding to the user input. Accordingly, an image rendered without valid pose information may not be an appropriate form to be provided to an actual user.

FIG. 1B illustrates an example of a simplified architecture for providing media stream service according to various embodiments of the present disclosure.

Referring to FIG. 1B, the content 31 may be a specific content provided to the 5GMS application server 100 by the 5GMS application provider 30. The content 31 may be, for example, various types of contents such as broadcasting service, a specific game, AR service, and/or VR service. In addition, in the example of FIG. 1A, only one content provider is illustrated, there may be multiple content providers. In addition, one content provider may provide the same content to multiple 5GMS application servers.

The server 100 may receive the content 31 and store the same in a predetermined memory region (not shown in FIG. 1B). In addition, when a service request for the stored content 31 is received from a specific user 2 or a user equipment 200, content data may be provided to the user 2 or the user equipment 200. When the content 31 is provided to the user 2, it may mean a series of processes of actually providing content data to the user equipment 200, reproducing the content data by the user equipment 200, and providing the corresponding content to the user 2. Accordingly, throughout the disclosure, it should be noted that provision of a content to a user includes such meaning.

According to the disclosure, if the content 31 provided by the server 100 is AR among the media stream, the server 100 may include a renderer (not shown in FIG. 1B). The renderer may generate and store image rendered based on pose information provided from the user equipment 200. In addition, the rendered image generated based on the pose information may be an image according to a result of prediction of the next operation of the user 2 by using the pose information. Accordingly, the server 100 may make an instruction to store the image while transmitting the same to the user equipment 200 in advance.

The media stream provided to the user 2 is provided through the user equipment 200, and thus, the user 2 may carry or wear the user equipment 200, or the user equipment may be put (disposed) at a position proper for watching a media content. To illustrate such state in FIG. 1B, it is illustrated that the user 2 and the user equipment 200 are attached to each other. For example, when the user equipment 200 has a shape of glasses, the user 2 may be in a state of wearing glasses for receiving the media stream. In such a case, the user equipment 200 may acquire pose information corresponding to the movement of the user and provide the acquired pose information to the server 100. For example, in case of the user equipment 200 having the shape of glasses, a rotation angle and a rotation amount of the user's head, information on an operation of moving the head up or down, a rotation speed, and information on the movement of the user forward/backward/leftward/rightward, etc., the user equipment 200 may use the acquired information as pose information and provide the same to the server 100.

In another example, the user equipment 200 may have complex shapes of two or more devices. For example, the user equipment 200 may be configured in a shape obtained through a combination of a smart watch and glasses. In another example, a single user equipment 200 may be implemented in a shape obtained through mixture of a separate image provision device, such as a beam projector and a 3D image provision device, and a communication device for communication with the server 100, while a user wears a specific sensing device. Proper information may be transmitted/received between the mixed devices in a wired/wireless scheme. For example, the sensor may provide a transmission/reception device with pose information obtained through detection of a movement of a user. In addition, the communication device may transmit information received from the server to the image provision device while providing receiving the pose information and providing the same to the server. According to a scheme described below, the image provision device may perform processing for provision of an image to a user.

Based on the scheme described above, the user equipment 200 may receive a rendered content from the server 100 and display the content on a display, so that the content may be provided to the user 2 even though the user equipment 200 does not have a specific content. In addition, even though the user equipment 200 has no performance for rendering the content in real time, it is possible to represent the content as if the content actually exists in front of the user, through reception of the rendered content from the server 100.

Referring back to FIG. 1B, as simply described in FIG. 1A, a network 10 using a 5G core network and a 5G base station or a 6G core network and a 6G base station may be included between the server 100 and the user equipment 200. In the disclosure, an operation according to the disclosure may be performed through not only a 5G mobile communication network and a 6G mobile communication network but also other types of wireless communication networks such as Wi-Fi, LTE, and LTE-A and even a wired communication network. Accordingly, the types of networks are not limited to a specific type, and for convenience of understanding, the 5G mobile communication network will be described as an example.

Figure 2:
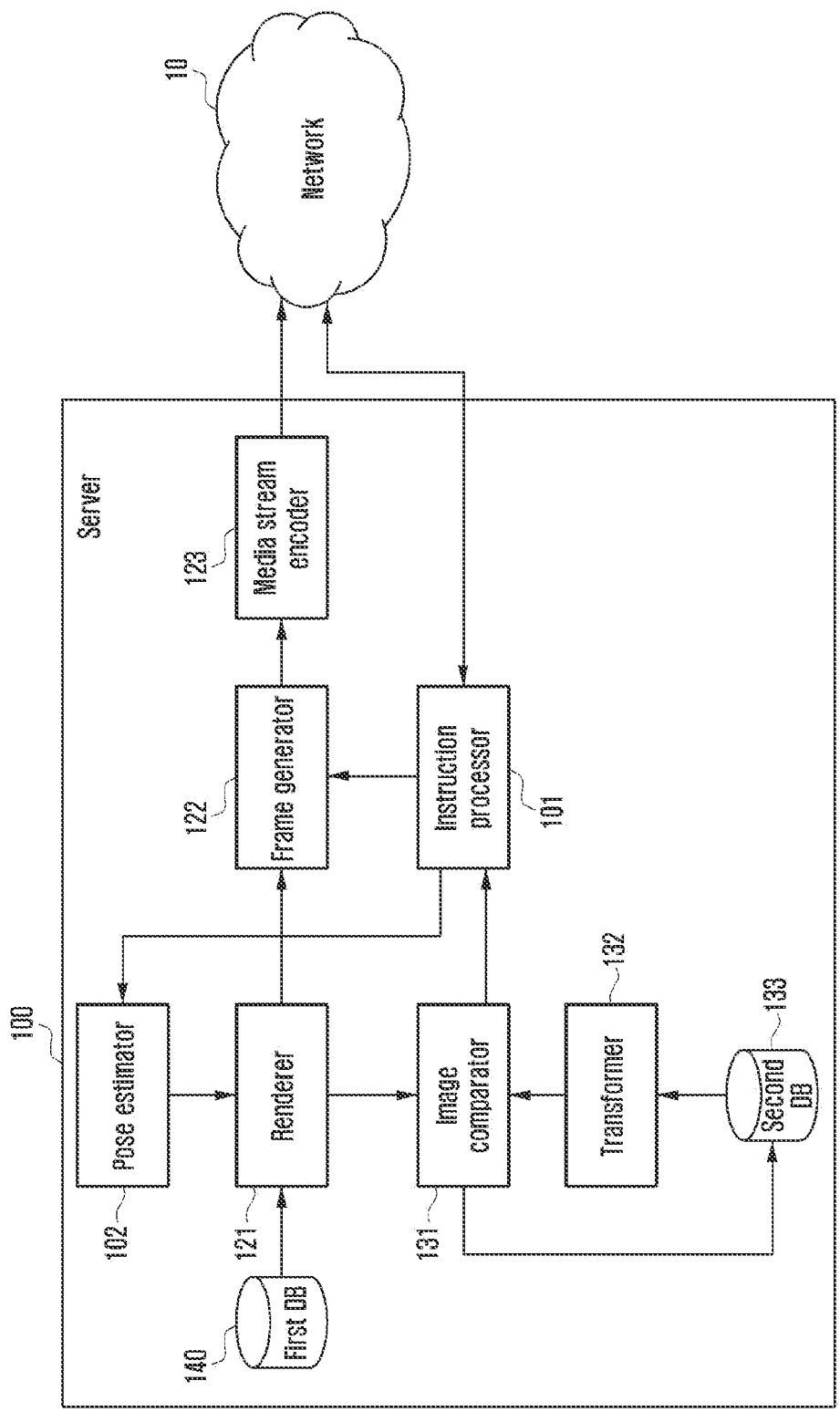
FIG. 2 is a block diagram illustrating a case of implementing a server according to a first embodiment of the present disclosure.

FIG. 2 is a block diagram illustrating a case of implementing a server according to a first embodiment of the present disclosure.

Before referring to FIG. 2, the server 100 of FIG. 2 may be the 5GMS application server 100 of FIG. 1A described above, and also may be the server 100 of FIG. 1B. In addition, in the configuration in FIG. 2, it should be noted that a configuration of a network interface for processing a frame to be transmitted to the network 10 is omitted and only a configuration for description of main contents of the disclosure is illustrated. In addition, some of the configurations illustrated in FIG. 2 or all configurations except for a memory may be implemented using one or more processors. Here, a processor may mean a physical processor such as a microprocessor. Hereinafter, each processor may use at least some functions of the microprocessor, or may be also implemented through logic separately implemented for an operation according to the disclosure.

Referring to FIG. 2, the server may include an instruction processor 101, a pose estimator 102, a renderer 121, a frame generator 122, a media stream encoder 123, an image comparator (or an image comparison engine) 131, a transformer (or a transform engine) 132, a first database 140, and a second database 133. A description of each of the elements in FIG. 2, for which two different expressions are used, is simply made. The image comparator 131 may be implemented in the form of a comparator, or may be configured as a module in the form of an engine in the server. Accordingly, in both cases including a case of being implemented as a comparator and a case of being implemented in the form of an engine, an operation for image comparison can be performed. In the same manner, the transformer 132 may be also implemented as a transformer, or may be configured as a module in the form of an engine for image transformation.

Hereinafter, each configuration and a simple operation of the server are described.

First, the first database 140 may be a memory for storing a content provided from the 5GMS application provider 30 described in FIG. 1A. The first database 140 may store contents provided from one or more application providers, and may be output to the renderer 121 when each content needs to be provided to the user equipment 200.

The instruction processor 101 may receive instruction information from the user equipment 200 through the network 10, and may also transmit instruction information to be provided to the user equipment 200 by the server 100 through the network 10. The instruction information received from the user equipment 200 may include pose information. Accordingly, the instruction processor 101 may generate a frame generation command, based on the pose information received from the user equipment 200, and provide the generated frame generation command to the frame generator 122.

In this case, the instruction processor 101 may provide the frame generation command to the frame generator 122 by additionally using information provided from the image comparator 131 to be described below. That is, when a frame is generated based on the pose information and the information from the image comparator 131, an instruction, which causes generation of a frame without an image, generation of a frame by minimizing an image, or transmission using a dummy frame rather than an image, or an instruction, which causes generation of a normal image, may be made. In addition, the instruction processor 101 may provide the pose estimator 102 by extracting the pose information from the instruction information received from the user equipment 200 through the network 10.

The pose estimator 102 may predict the next movement of a user by using the pose information received from the instruction processor 101. Such prediction is made wherein pieces of pose information are accumulated for a predetermined time interval and stored, and some pieces of pose information are weighted, so that a movement of the user can be predicted. Accordingly, the pose estimator 102 may estimate a pose of the user at a predetermined time point in the future by using the pieces of pose information accumulated at least two or more times. Here, the pose at the predetermined time point in the future may be a pose at a time point at which a rendered image is provided to the user equipment 200 by the server 100. In addition, various types of prediction algorithms performed in the pose estimator 102 are well known in the art, and thus, in this disclosure, the algorithms are not limited to one special prediction algorithm. The pose estimator 102 may provide information on the predicted movement of the user to the renderer 121.

The renderer 121 may perform rendering of a specific image to be transmitted while making the image correspond to a content stored in the first database 140, based on the estimated pose information of the user, received from the pose estimator 102. The rendered image may be provided to the frame generator 122 and the image comparator 131.

The image comparator 131 may store the image received from the renderer 121 in the second database 133. In addition, the image comparator may read the image stored in the second database 133 through the transform 132 and compare the same with the image processed in the renderer 121, as necessary. The image comparator 131 may compare the pre-stored image and the image stored in the renderer 121, and transmit a result of the comparison to the instruction processor 101. In addition, the image comparator 131 according to the disclosure may allow only a specific image among the images received from the renderer 121 to be stored in the second database. For example, the image comparator may select a representative image corresponding to a specific representative pose, and may pre-register the selected representative image.

The second database 133 may store the rendered image provided from the image comparator 131, and may store the image, based on a specific mapping rule during image storing. Such rule will be described in detail below. In addition, the pre-registration image may be provided to the transformer 132, based on control of the image comparator, the instruction processor 101, or a processor (not shown in FIG. 2) providing a specific content of the server 100. In the disclosure, in addition to the configuration described above, a configuration of making an instruction to read the image stored in the second database 133 may be processed in the pose estimator 102 or the renderer 121. There is no limitation to a specific element for reading the pre-registration image stored in the second database 133, and thus, it should be noted that a connection of lines for controlling the same is not illustrated in FIG. 2.

When the pre-registration image is input from the second database 133, the transformer 132 may transform the image into a form which can be processed in the image comparator 131 and provide the transformed image to the image comparator 131.

The frame generator 122 may generate a frame by using the rendered image received from the renderer 121, based on the frame generation command received from the instruction processor 101. As described above, the frame generation command may be executed through an instruction allowing an image to be included, an image to be minimized, only dummy data to be transmitted, or a frame to be generated without an image. The image frame generator 122 may configure one frame for transmitting the rendered image, based on the frame generation command, and then provide the frame to the media stream encoder 123.

The media stream encoder 123 may encode the received frame according to a media stream type. In another example, in FIG. 2, the media stream encoder 123 may be replaced with another encoder. For example, when a provided content is not a media stream, the media stream encoder may be replaced with an encoder for encoding the corresponding data.

The frame encoded by the media stream encoder 123 may be transformed in accordance with a network interface, and may be provided to the user equipment 200 through the network 10.

A description of an operation in the server 100 described above will be made. First, the server 100 according to the disclosure may transmit the pre-rendered image to the user equipment 200 to be stored therein. Accordingly, determination on whether for the server 100 to transmit the rendered image in advance and store the same in the user equipment 200 may be made. Such determination may be made by the instruction processor 101.

According to an embodiment, the instruction processor 101 of the server 100 may determine a representative pose of a content, and determine an image to be pre-registered in the user equipment 200. Such determination may be made based on a program for determining a representative image pre-configured in the instruction processor 101, or based on separate information provided from the 5GMS application provider 30 providing a content. For example, for the content 31, there may be representative pose information designated by the 5GMS application provider 30. In such a case, the instruction processor 101 may generate an image to be stored in the user equipment 200, based on the representative pose information.

For example, the representative pose information may be provided as content metadata by the 5GMS application provider 30 providing the content. If there is content metadata, the content metadata may provide a representative pose and additional information for each pose. Accordingly, the instruction processor 101 may determine a representative pose, based on a representative surface (a front surface, a left/right surface, a face, a complex geometric surface, a complex texture, transparency, etc.) determined through analysis of the characteristics of the content. Examples of the content metadata are as follows in <Table 1> below.

TABLE 1

| | Content metadata |
|---|---|
| num_content_pose | Number of pieces of representative pose information of content |
| for num_content_pose: | |
| pose_information | Representative pose information of content |
| effective_space_info | Effective space information for each pose |
| weight_for_pose | Weight information in consideration of reuse of pose |

As shown in the examples in <Table 1>, the content provider may provide the content metadata, and accordingly, the instruction processor 101 may have at least one of representative pose information, effective space information for each pose, and weight information in consideration of reuse of a pose, from the content metadata.

Accordingly, although a line for control is not shown in FIG. 2, the instruction processor 101 may control the first database 140 and the renderer 121 to perform control of generation of an image to be stored in the user equipment 200, based on the content metadata.

Another method of determining the representative pose will be described.

According to another embodiment of the disclosure, a representative pose may be determined based on a user's location on a space, and a pre-registered image may be generated.

For example, the pre-registered image may be generated with reference to a front surface of the user facing the content. In another example, when multiple contents are arranged on the space, a pre-registered image may be generated for a surface remaining after excluding a surface hidden by other contents or not shown as in a case of an image positioned on a plane such as a wall or a floor at the location of the user. In another example, a future motion is predicted based on a motion history of a current user or motion histories of most users, and a pre-registered image may be generated with reference to a surface having a high hitting ratio.

According to another embodiment of the disclosure, the number of representative poses may be determined based on the performance of the network or the user equipment, weights are applied for selection from a candidate group of the representative poses, and a pre-registered image corresponding to a selected representative pose may be generated. For example, a transform performance and a storage capacity of the user equipment 200 may be considered. Information on the transform performance and the storage capacity of the user equipment 200, etc., may be received when service initiation is required through a network, for example, a 5G network. Alternatively, information on the transform performance and the storage capacity of the user equipment 200, etc., may be received while the user subscribes to a specific content service.

When the transform performance of the user equipment 200 is low, transformation is possible only for limited sizes (some regions) within limited times, instead of all regions, and thus, a pre-registered image may be generated for each image with limitation to a partial limited region having a higher weight. In another example, when the storage capacity of the user equipment 200 is small, a pre-registered image may be generated with limitation to an image having a higher weight. In another example, a transmission performance of the network 10 connected to the user equipment 200 may be considered. If the latency of the transmission performance of the network is high, a pre-registered image may be transmitted in advance in the background by using a separate channel. In another example, when a bandwidth of the connected network 10 is not sufficient, a maximum number of images among the rendered images to be transmitted may be selected as pre-registered images so that the reuse can be increased, and accordingly, the amount of data transmitted to the user equipment 200 can be reduced.

According to at least one of the methods described above, the instruction processor 101 of the server 100 may make a pair of the rendered image and the corresponding pose region information and store the same in the second database 133. Hereinafter, such information is called "image-pose pair information." The instruction processor 101 of the server 100 may instruct storing of the image-pose pair information in the second database 133 and transmitting of the image-pose pair information to the user device 200 to be stored therein, simultaneously or at another specific time point. Thereafter, when information indicating the use of the image-pose pair information is received from the server 100, the user equipment 200 may configure an image by using the information. The image-pose pair information may correspond to information configured as a pair of the image rendered by the renderer 121 and the pose information. Accordingly, the second database 133 stores the image-pose pair information, and thus, for comparison in the image comparator 131 later, the information needs to be provided through extraction of image information only or division of the extracted image-pose pair information into the pose information and the image. Accordingly, the transformer 132 may perform an operation of providing information through division into the image and the pose information.

According to another embodiment of the disclosure, whether to store, in the user equipment 200, a specific image among the rendered images transmitted by the server 100, as a pre-registered image, or to collect rendered images and generate a new pre-registered image to transmit image-pose pair information may be determined.

The instruction processor 101 of the server 100 may select representative poses, based on the locations of the content and the user on the space, the performance of the user equipment 200, and the performance of the network 10, and generate rendered images corresponding to the pose and a list of pieces of metadata connected to the rendered images. Such list of pieces of metadata may be a list of pieces of image-pose pair information.

In a case where a specific image among the transmission of the rendered images is stored, a user pose received from the user equipment 200 is similar to the representative pose, the instruction processor 101 may instruct the user equipment 200 to store the corresponding rendered image as a pre-registered image.

When a separate rendered image is generated and transmitted, only images rendered from the selected representative poses may be collected, so that a separate rendered image is configured and transmitted as shown in FIGS. 5A to 5D below.

Next, a case where the server 100 instructs reuse of the pre-registered image to the user equipment 200 is described.

The instruction processor 101 of the server 100 may receive information on the user pose from the user equipment 200 through the network 10. The instruction processor 101 may then extract the received pose information and provide the same to the pose estimator 102. The pose estimator 102 may provide the renderer 121 with the received pose information. The renderer 121 may read the content from the first database 140, based on the pose information received from the pose estimator 102 and perform rendering of an image to be transmitted to the user equipment 200. In addition, the renderer 121 may provide the rendered image to the image comparator 131 and the frame generator 122. The image comparator 131 may perform control to output a specific image from the pre-registered images, based on the pose information and the rendered image generated by the renderer 121. Accordingly, the transformer 132 may transform the image to enable comparison between the rendered image with the image received from the second database 133 and output the same to the image comparator 131. The image comparator 131 may compare the image rendered by the renderer 121 with the pre-registered image received from the transformer 132.

Hereinafter, an operation of comparing images by the image comparator 131 will be described in more detail. The image comparator 131 may perform correlation comparison between the rendered image and the image provided from the transformer 132. Such correlation comparison may be performed in various ways.

For example, scores of similarity may be obtained by using one or more comparison methods. In another example, different results may be output for each comparison method according to the characteristics of the content, for example, the texture or the geometry. When there is similarity in the texture, the similarity between two images may be high even though the geometries are different. In the same condition, when a difference in the geometry structure is big, for example, when a hole exists in the structure, the similarity may be low. The image comparator 131 may use one of or two or more of the comparison methods above. When the image comparator 131 uses two or more methods, the similarity may be determined by collecting results of the respective methods. Such collective method may be configured to determine the similarity by using pre-configured conditions for the results of the respective comparison methods. The pre-configured conditions may indicate a thresholds value as the basis for similarity determination, or may be based on information received from a content creator, a content provider, or a separate service providing company.

Therefore, the image comparator 131 may have different item-specific weights of the texture or the geometry according to the comparison method. That is, the image comparator 131 may determine the similarity based on a final integrated value in consideration of weights calculated for each comparison method and each item.

When the similarity is determined, the image comparator 131 may provide the instruction processor 101 with a result of the comparison. When the similarity is high, the instruction processor 101 may determine to instruct the user equipment 200 to transform an original image and utilize the same, and may transmit the instruction to the user equipment 200.

When the comparison result provided from the image comparator 131 shows low similarity but image reuse in the future is expected, the instruction processor 101 may instruct the user equipment 200 to store a currently transmitted image so that the image can be reused.

The instruction information may be provided to the frame generator 122, and the frame generator may generate information of one frame by using the instruction information together with the rendered image. Thereafter, the instruction information and the image configured as one frame may be provided to the media stream encoder 123. The media stream encoder 123 may encode both the instruction information and the image configured as a frame. In this case, the instruction information may be transmitted through a method such as supplemental information of an image, i.e., a video, and a sender report of a real-time transport protocol (RTCP).

The instruction information according to the disclosure may be divided into instruction information transmitted to the user equipment 200 by the server 100, and instruction information transmitted to the server 100 by the user equipment 200. Accordingly, for identification, the instruction information transmitted to the user equipment 200 by the server 100 is called "server instruction information," and the instruction information transmitted to the server 100 by the user equipment 200 is called "user instruction information."

The server instruction information may instruct, for example, at least one of following five operations:

(1) 0: store;

(2) 1: reuse;

(3) 2: asking report;

(4) 3: update pre-registered image database; or (5) 4: delete pre-registered image.

If the server instruction information indicates "0," an instruction on storing an image is made. When the server instruction information indicates "0," metadata for a pre-registered image may be additionally provided.

In another example, when the server instruction information indicates "1," the following information in <Table 2> may be included.

TABLE 2

| | |
|---|---|
| elif operation == 1: | Instruct reuse of image |
| content_identifier | Content identifier |
| image_identifier | image identifier timestamp, frame number, incremental number, etc. are possible. |
| region_identifier | Region identifier |
| estimated_pose | Estimate pose |

In another example, when the server instruction information indicates "2," the following information in <Table 3> may be included.

TABLE 3

| | |
|---|---|
| elif operation == 2: | Request state report from device |
| request_range | 0 all content (all content IDs managed by device) 1 all content (all content IDs managed by device and each image ID) 2 all region (all content IDs managed by device, each image ID, and each region ID) |
| has_content_identifier | Whether to instruct content_identifier |
| if has_content_identifier == True: | |
| content_identifier | If instructed, instruct to report only images corresponding to corresponding content_identifier |
| has_image_identifier | Whether to instruct image_identifier |
| if has_image_identifier == True: | If instructed, instruct to report only images corresponding to corresponding image_identifier |
| image_identifier | |

In another example, when the server instruction information indicates "3," the following information in <Table 4> may be included.

TABLE 4

| | |
|---|---|
| elif operation == 3: | Update metadata of image |
| content_identifier | Content identifier |
| image_identifier | Image identifier |
| region_identifier | Region identifier |
| updated_metadata | Updated metadata |

In another example, when the server instruction information indicates "4," the following information in <Table 5> may be included.

TABLE 5

| | |
|---|---|
| elif operation == 4: | Delete image |
| content_identifier | Content identifier |
| image_identifier | Image identifier |
| region_identifier | Region identifier |

Next, the user instruction information may instruct, for example, at least one of the following four operations:
(1) 0: error report;
(2) 1: processing result;
(3) 2: requesting image; or
(4) 3: pre-registered image database status.

If the user instruction information indicates "0," a fact that there is no content or image instructed to be reused may be instructed. When the user instruction information indicates "0," the following information in <Table 6> may be included.

TABLE 6

| | |
|---|---|
| if operation == 0: | No such ID: no content or image instructed to be reused |
| Type | Content or image |
| ID | Identifier |

When the user instruction information indicates "1," the following information in <Table 7> may be included.

TABLE 7

| | |
|---|---|
| elif operation == 1: | Return result of reuse |
| requested_content_ID | |
| requested_image_ID | |
| estimated_pose | Pose estimated from server |
| latest_pose_of_user_for_the_image | Latest pose shown to user |
| latest_pose_at_time | Latest time shown to user |
| has_used_another_image_ID | Whether image different from pre-registered image designated by server is used |
| if has_used_another_image_ID == True: | |
| num_used_image_ID | Number of used pre-registered images |
| for num_used_image_ID | |
| used_image_ID | ID of used pre-registered image |
| region_xywh | Information on region of used pre-registered image |

When the user instruction information indicates "2," the following information in <Table 8> may be included.

TABLE 8

| | |
|---|---|
| elif operation == 2: | Request rendering image according to user pose |
| requested_content_ID | Requested content ID |
| user_pose | Requested pose |
| requested_at_time | Measure time of requested pose |
| device_capability | device_capability device performance information (including transform performance) |
| network_performance | Network performance information |

When the user instruction information indicates "3," the following information in <Table 9> may be included.

TABLE 9

| | |
|---|---|
| elif operation == 3: | Pre-registered image database state information |
| num_content | Number of contents |
| for num_content: | |
| content_identifier | |

TABLE 9-continued

| | |
|---|---|
| num_images | Number of images |
| for num_images: | |
| image_identifiers | |
| image_pose | |
| num_regions: | Number of regions |
| for num_regions: | |
| region_identifiers | |
| region_pose | |

Based on the information above, the server 100 may provide instruction information to the user equipment 200, based on the details described above, and the user equipment 200 may also provide the instruction information to the server 100 by using the scheme described above.

Next, metadata of the pre-registered image provided to the user equipment 200 by the server 100 may include the following information in <Table 10> below.

TABLE 10

| | |
|---|---|
| content_identifier | Display content of image |
| is_frame_packed | Display whether image corresponds to frame packed rendered image |
| if is_frame_packed == True: | |
| num_regions | Number of regions. If is_frame_packed is false, is_frame_packed has default value (1). |
| is_pre-registration_only | Perform storing without displaying |
| for num_regions: | |
| image_identifier | Identifier for image generated from corresponding content |
| region_identifier | Identifier for some regions of image |
| region_xywh | Location and size of region of image |
| display_region_xywh | Location and size of region to be applied to display buffer |
| content_pose | Information on location and direction of content on space |
| render_pose | Information on representative pose used for rendering |
| allowable_pose_range | Transformable range: information on space allowing transformation. Deviation from range causes distortion, and thus information may be used to determine whether to attempt restoration for frame by device later. |

The operation of the server 100 of FIG. 2 will be further described.

The server 100 may identify a content displayed by each user equipment 200 and pre-registered images stored for the corresponding content as in the method described above. Accordingly, the server 100 may perform the following three operations.

In one example of operation (1), the server 100 may manage a database of a pre-registered image instructed to be stored for each user equipment 200. Here, the database may mean management of the second database 133 only or management of the database included in the user equipment 200 together.

In one example of operation (2), the server 100 may request and identify a list of images stored for each user equipment 200.

In one example of operation (3), the server 100 may identify whether there is a specific image before instructing reuse of the image to the user equipment 200.

In a case of (1), the server 100 may manage the list of images instructed to be stored for each user equipment 200. When the list of images instructed to be stored for each user equipment is managed, a session may be established between the server 100 and the user equipment 200 during connection, and when the connection is lost, the session configured between the server 100 and the user equipment 200 may be released. When the session is established between the server 100 and the user equipment 200, the list of images instructed to be stored may be managed as additional information belonging to the session. In addition, when a new session is established due to instability of the network connection, etc., the user equipment 200 may report the list of images and contents stored in the previous session to the server 100, and the server 100 may manage the additional information of the session by including the list and the contents.

In a case of (2), when the server 100 requests and identifies the list of images stored for each user equipment 200, the server 100 may be in a loosely coupled relationship with the user equipment 200. Accordingly, when a time configured as a time out in a timer (not shown) configured with a predetermined time passes, the server 100 may consider that the list of images of the server 100 is not reliable even though the content is requested by the same user equipment. Accordingly, the server 100 may instruct to report the list of images to the corresponding user equipment 200 periodically, or before the time out occurs. When the list of images is received from the user equipment 200 before the time out, a time out time may be reset or extended. On the other hand, when there is no response to the image list request from the user equipment, the list of images of the corresponding user equipment 200, which has been managed by the server 100, may be deleted after the time out. That is, information stored in the second database 133 may be deleted.

In a case of (3), when the server 100 identifies from the user equipment 200 whether the user equipment has the corresponding image before instructing the reuse, the server does not manage the list of images and contents for each device. When the similarity between the stored image having been managed by the server 100 and an image currently rendered by the server 100 is high, the server 100 may transmit a content ID, an image ID, and metadata to the user equipment 200 to request the reuse of the corresponding image from the user equipment 200, and when the user equipment 200 reports that the user equipment does not have the corresponding image, the server may transmit the rendered image or transmit a representative image and transform metadata and instruct the user equipment 200 to store the corresponding image.

As described above, the server 100 may compare the pre-registered image with the image rendered from the user pose and the estimated pose, so as to identify the similarity therebetween. For such similarity identification, the above-described method may be used.

The server 100 may determine whether to instruct to reuse the pre-registered image of the user equipment 200, according to the similarity. For example, when the identification is made that the similarity is high, the server 100 may transmit, to the user equipment 200, instruction information instructing to reuse the pre-registered image with or without transformation.

The reuse instruction information may be inserted as additional information of a video together with the encoded image data, or may be transmitted according to the method such as a sender report of an RTCP.

If the reuse instruction is transmitted as the additional information of the video, specific information may be transmitted to achieve an effect of bandwidth saving and causing no problem in an operation of a decoder in the user equipment 200. This will be described in more detail with reference to FIGS. 6A and 6B below.

Figure 6A:
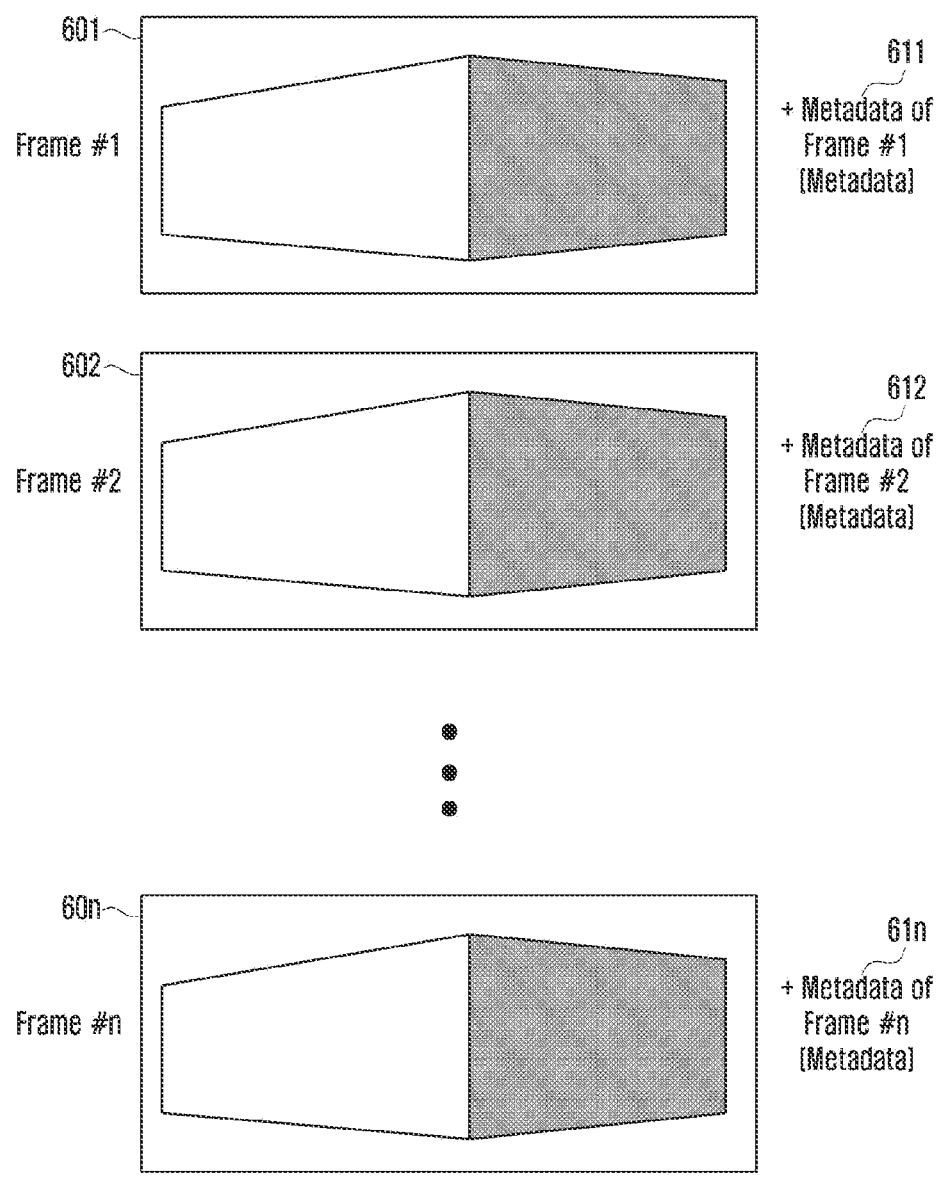
FIG. 6A illustrates a frame transmission timing for describing an effect of a case of using a pre-registered image according to various embodiments of the present disclosure.
Figure 6B:
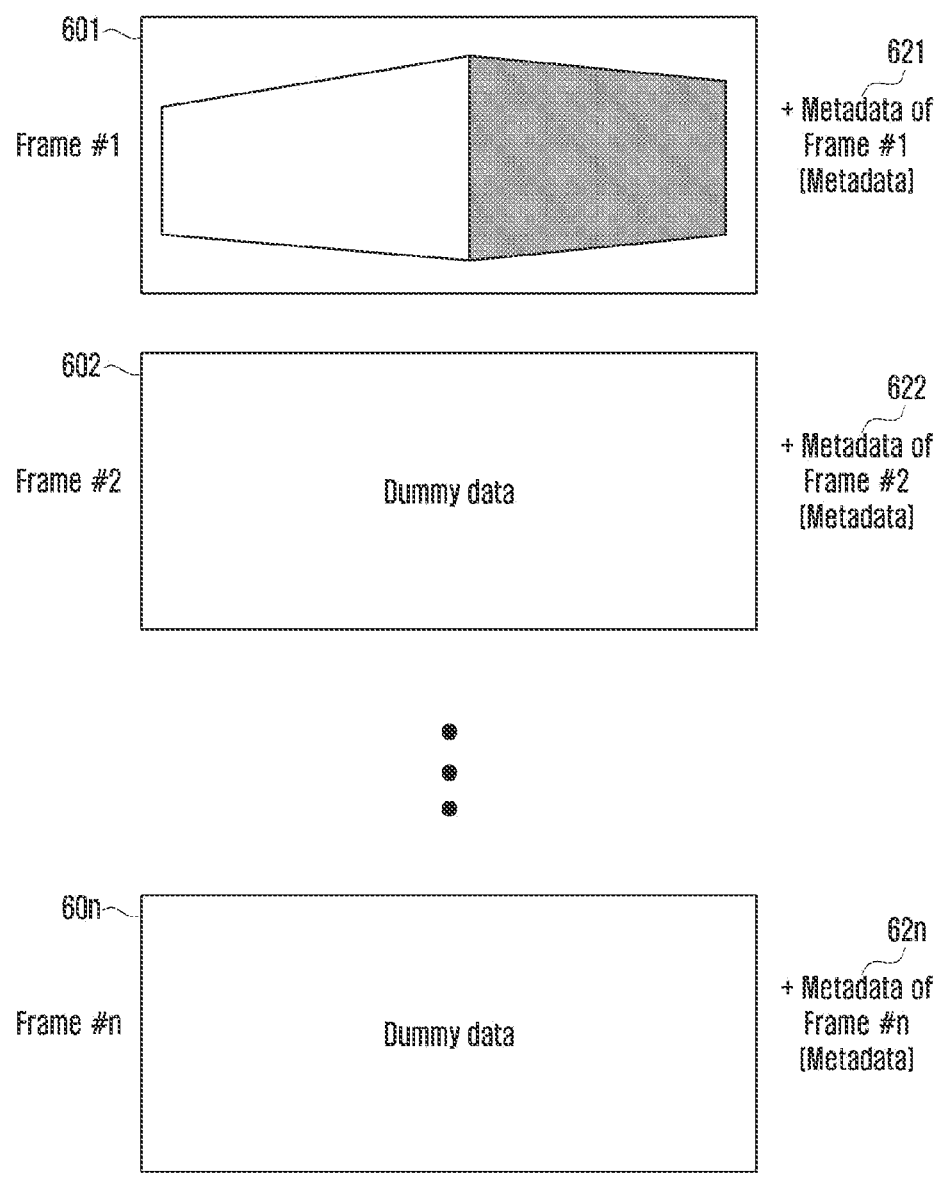
FIG. 6B illustrates a frame transmission timing for describing an effect of a case of using a pre-registered image according to various embodiments of the present disclosure.

Image information transmitted at each frame as shown in FIG. 6A may be filled with dummy data as shown in FIG. 6B. For example, when all pixels in the frame have the same value, an effect of video compressing can be achieved, whereby the size of data is reduced.

Figure 3:
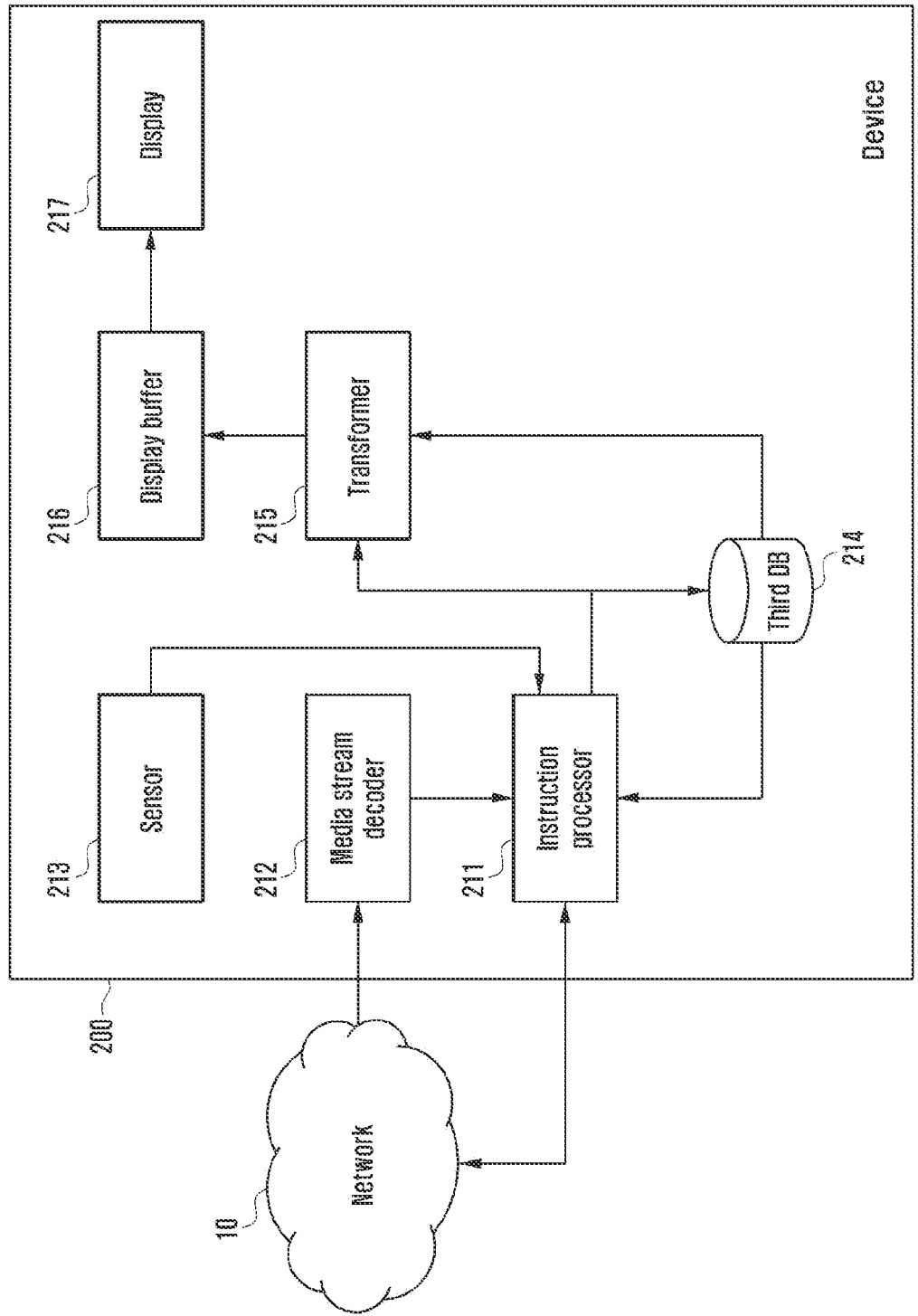
FIG. 3 is a block diagram illustrating a case of implementing a user equipment according a second embodiment of the present disclosure.

FIG. 3 is a block diagram illustrating a case of implementing a user equipment according a second embodiment of the present disclosure.

Before referring to FIG. 3, it should be noted that elements for transmitting/receiving data to/from a wired/wireless communication network are not illustrated in FIG. 3. For the elements for transmitting/receiving the data to/from the wired/wireless communication network, there may be a small difference between a case of wireless communication and a case of wireless communication. For example, wireless communication may include a wireless processor, an antenna, and a wireless modem, and data may be transmitted and received in a proper scheme according to each wireless communication protocol. As a representative example of a wireless communication system, there may be LTE, LTE-A, 5G, and/or Wi-Fi wireless communication schemes. There may be different data processing schemes required for the respective wireless communication schemes, and thus, the wireless processor may transmit and receive data according to the data processing scheme.

In addition, the wired communication may include a wired data processor and a network interface. In the wireless communication, the wired data processor and the network interface may operate according to each wired communication protocol. The elements according to such wired and wireless communication are well known in the art, and thus, an additional description thereof will be omitted here.

Referring back to FIG. 3, a user equipment 200 may include an instruction processor 211, a media stream decoder 212, a sensor 213, a third database 214, a transformer 215, a display buffer 216, and a display 217. In an example of FIG. 3, an input unit for receiving an input from a user by the user equipment 200 is not illustrated, and other power supply-related units to which power is supplied are not also illustrated. According to the disclosure, only elements required to provide content data to the user in a state in which split processing between the user equipment 200 and the server 100 is performed. Hereinafter, a description of each element will be described.

The media stream decoder 212 may decode a media stream received from a network, and provide a result of the decoding to the instruction processor 211. In this case, as described in FIG. 2, the server 100 may transmit server instruction information through metadata and an image in a frame transmitting the media stream. In such a case, the media stream decoder 212 may extract the server instruction information from the frame of the received media stream, and provide each of the server instruction information and the image data to the instruction processor 211.

The instruction processor 211 may output the image data and the server instruction information received from the media stream decoder 212 to the third database 214 and the transformer 215. When the image data is transmitted to the third database 214, as described in FIG. 2, the image data may be provided as image-pose pair information, or only specific metadata corresponding to the image may be stored. In another example, metadata may be further stored by adding the image-pose pair information. In addition, the instruction processor 101 may provide the decoded image to the transformer 215.

The instruction processor 211 may generate a user instruction message, based on user pose information received from the sensor 213, and transmit the generated user instruction information to the server 100 through the network 10. In addition, as described in FIG. 2, such user instruction information may be generated based on the server instruction information received from the server 100.

The sensor 213 may include one or more sensors which can obtain information on a movement of a user's head, detection of a user's movement, direction shifting of a user, a change in the altitude, etc. The sensor may collect all information relating to the user's movements, and provide the same to the instruction processor 211 as a user pose or pose information.

The transformer 215 may generate an image to be displayed to the user by using a decoded image received from the instruction processor and/or an image received from the third database 214, and provide the same to the display buffer 216. For example, when the server instruction information instructs to use a pre-registered image, the instruction processor 211 may instruct to use the image received from the third database 214 while providing the decoded image to the transformer 215. The transformer 215 may transform an image to be provided to the user by using the image stored in the third database 214. In addition, in some cases, the images may be provided to the display 217 without the display buffer 216. In another example, the display buffer 216 may be included in the display 217.

In another example, the instruction processor 211 may instruct to provide the decoded image to the user. That is, the instruction processor may instruct not to use the image from the third database 214. In such a case, the transformer 215 may process the image received from the instruction processor 211 into an image to be provided to the user, and store the same in the display buffer 216.

The display buffer 216 may store the image in units of frame to be provided to the user, and provide the image to the display 217 according to a display speed at which the image is provided to the user.

Figure 4A:
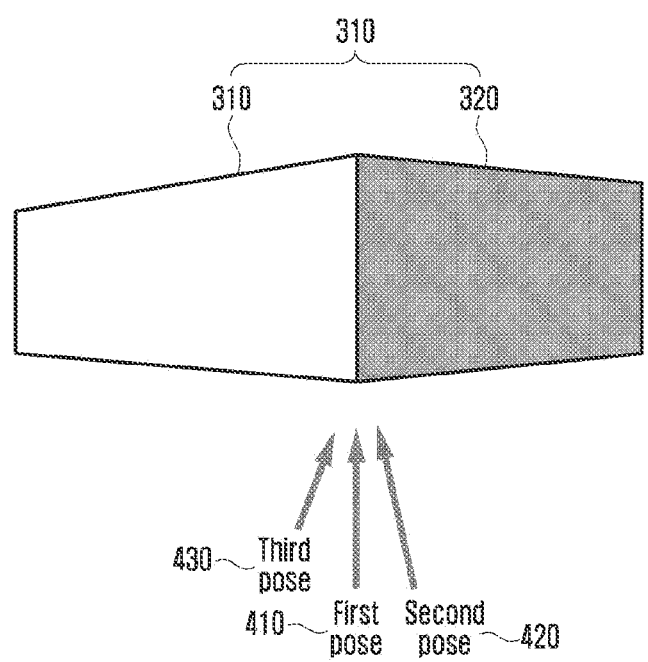
FIG. 4A is an example illustrating a rendered image based on different poses of a user according to various embodiments of the present disclosure.
Figure 4B:
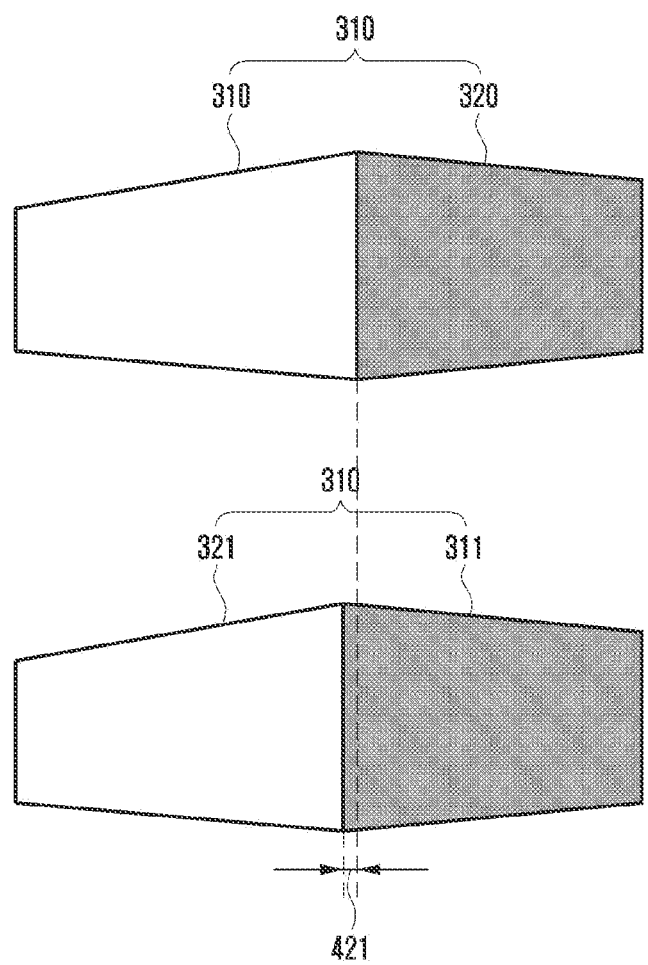
FIG. 4B is an example illustrating a rendered image based on different poses of a user according to various embodiments of the present disclosure.
Figure 4C:
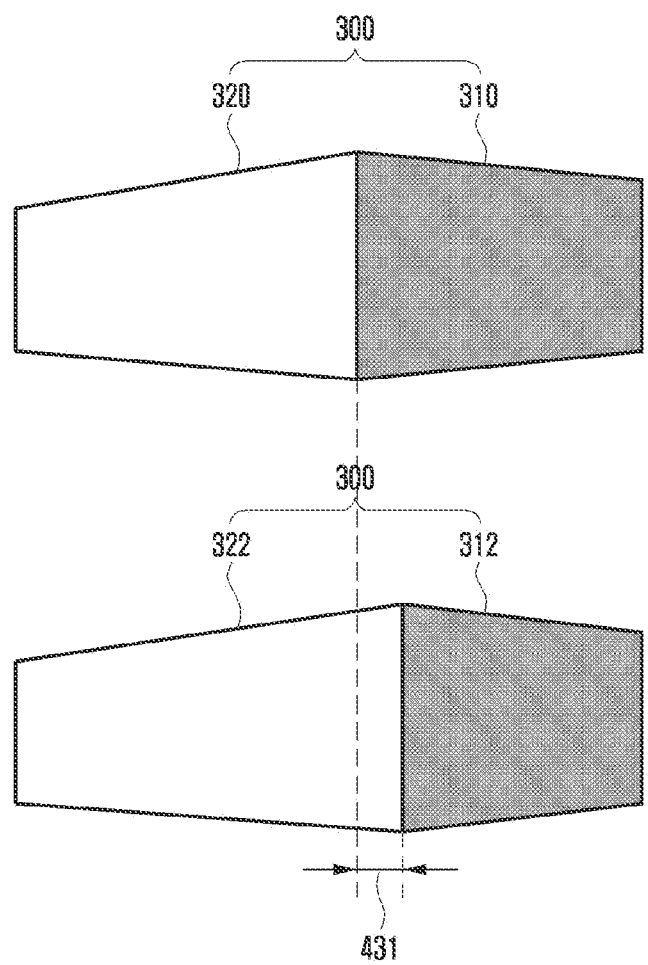
FIG. 4C is an example illustrating a rendered image based on different poses of a user according to various embodiments of the present disclosure.

FIG. 4A is an example illustrating a rendered image based on different poses of a user according to various embodiments of the present disclosure, FIG. 4B is an example illustrating a rendered image based on different poses of a user according to various embodiments of the present disclosure, and FIG. 4C is an example illustrating a rendered image based on different poses of a user according to various embodiments of the present disclosure.

Referring to FIG. 4A, for convenience of description, one building 300 is illustrated. The building 300 may include a right wall 320 and a left wall 310. In addition, it is assumed that a user 2 may make a first pose 410, a second pose 420, and a third pose 430. The first pose 410 may be the location and the gaze of the initial user 2 in for example, VR, a game, or the like. Thereafter, the pose of the user may change to a pose such as the second pose 420 or the third pose 430.

When the user moves rightward from the initial first pose 410, the pose may change to the location of the second pose 420, and when the user moves leftward from the initial first pose 410, the pose may change to the third pose 430. When the pose of the user changes, an image may change accordingly. This will be described with reference to FIG. 4B.

FIG. 4B illustrates a change in angle at which the building 300 is viewed when the user moves rightward according to various embodiments of the present disclosure.

The initial first pose 410 may be illustrated in a form in which, as shown in the building 300 at the upper part of FIG. 4B, division is made into regions of the left wall 320 and the right wall 310. When the user does not move or a content itself does not change, in the building 300, the sizes of the regions of the left wall 320 and the right wall 310 may not change and may be maintained the same during the corresponding time.

In this case, when the user pose changes leftward, a change such as a state 321 in which the size of the left wall of the building 300 reduces, and a state 311 in which the size of the right wall increases may be made. That is, as shown in reference numeral 421, the size of a wall in the second pose may partially change, compared to the first pose 410. Accordingly, this transform may be directly processed by the user equipment 200, or according to the disclosure, image data according to the second pose 420 may be pre-generated and transmitted. When the pre-generated image is used, the server 100 may instruct to transmit server instruction information as described above and display information of the building 300 illustrated at the lower part of FIG. 4B.

In another example, when the user equipment 200 can change an image in response to a small change, only information on the image change may be provided to the user equipment 200. That is, the server 100 may provide server instruction information instructing the image change to the user equipment in response to the second pose 420.

By providing the user equipment 200 with the server instruction information instructing the reuse of the pre-registered image, a realistic image may be provided to the user without transmission of the image. In addition, a bandwidth (BW) of a network between the server 100 and the user equipment 200 can be saved.

FIG. 4C illustrates a change in an angle at which the building 300 is viewed when the user moves leftward according to various embodiments of the present disclosure.

The initial first pose 410 may be illustrated in a form in which, as shown in the building 300 at the upper part of FIG. 4C, division is made into regions of the left wall 320 and the right wall 310. When the user does not move or a content itself does not change, in the building 300, the sizes of the regions of the left wall 320 and the right wall 310 may not change and may be maintained the same during the corresponding time.

In this case, when the user pose changes leftward, a change such as a state 322 in which the size of the left wall of the building 300 increases, and a state 312 in which the size of the right wall reduces may be made. That is, as shown in reference numeral 431, the size of a wall in the third pose may partially change, compared to the first pose 410. Accordingly, this transform (re-projection or warping) may be directly processed by the user equipment 200, or according to the disclosure, image data according to the third pose 430 may be pre-generated and transmitted. When the pre-generated image is used, the server 100 may instruct to transmit server instruction information as described above and display information of the building 300 illustrated at the lower part of FIG. 4C.

In another example, when the user equipment 200 can change an image in response to a small change, only information on the image change may be provided to the user equipment 200. That is, the server 100 may provide server instruction information instructing the image change to the user equipment in response to the third pose 430.

By providing the user equipment 200 with the server instruction information instructing the reuse of the pre-registered image, a realistic image may be provided to the user without transmission of the image. In addition, a bandwidth (BW) of a network between the server 100 and the user equipment 200 can be saved.

Figure 5A:
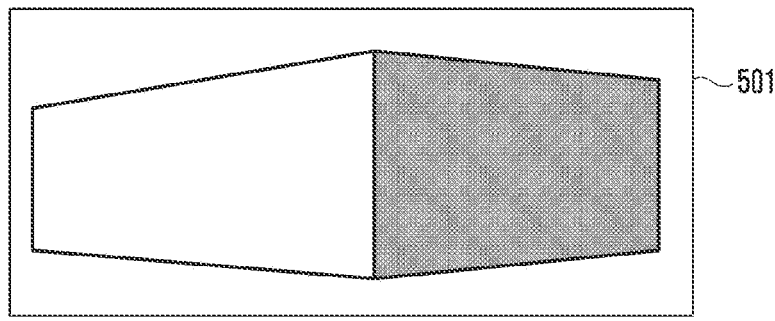
FIG. 5A illustrates examples of various embodiments of transmission of a rendered image according to various embodiments of the present disclosure.
Figure 5B:
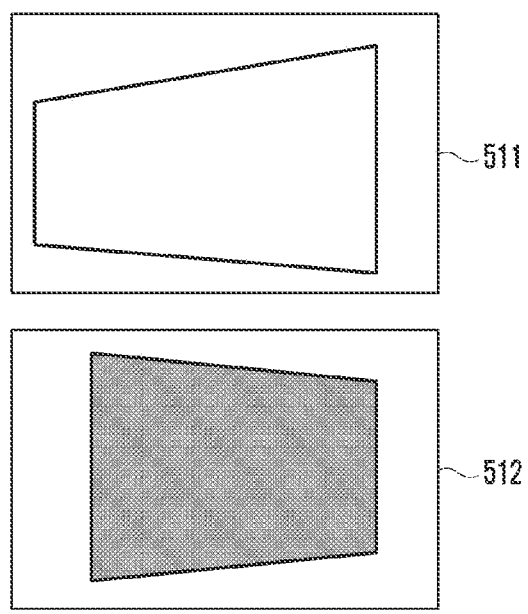
FIG. 5B illustrates examples of various embodiments for transmission of a rendered image according to various embodiments of the present disclosure.
Figure 5C:
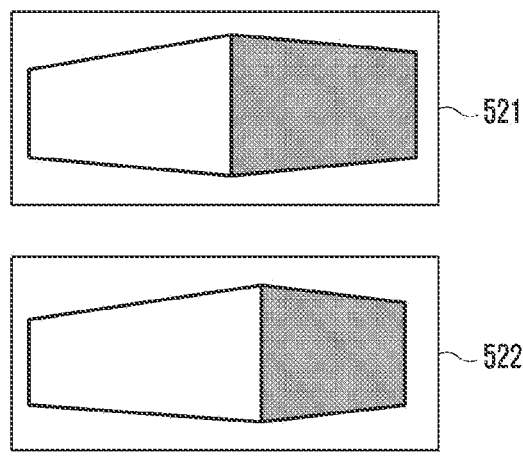
FIG. 5C illustrates examples of various embodiments for transmission of a rendered image according to various embodiments of the present disclosure.
Figure 5D:
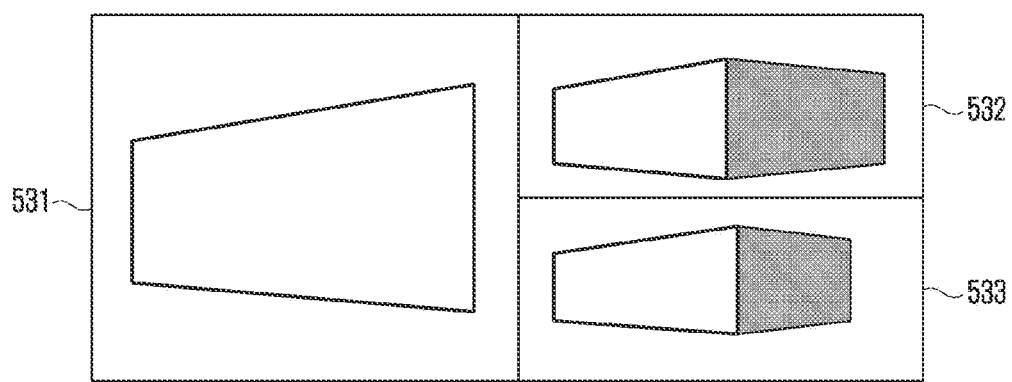
FIG. 5D illustrates examples of various embodiments for transmission of a rendered image according to various embodiments of the present disclosure.

FIG. 5A illustrates examples of various embodiments of transmission of a rendered image according to various embodiments of the present disclosure, FIG. 5B illustrates examples of various embodiments for transmission of a rendered image according to various embodiments of the present disclosure, FIG. 5C illustrates examples of various embodiments for transmission of a rendered image according to various embodiments of the present disclosure, and FIG. 5D illustrates examples of various embodiments for transmission of a rendered image according to various embodiments of the present disclosure.

Referring to FIG. 5A, it is illustrated that the building illustrated in FIGS. 4A to 4C above is transmitted as a frame packed rendered image in one frame. That is, reference numeral 501 indicates one frame, and it is assumed that an image of the building is transmitted in one frame. FIG. 5A illustrates a case where one image is configured as one frame and transmitted in one frame.

Referring to FIG. 5B, it is illustrated that a right wall of the building and a left wall of the building are transmitted in two different frames 511 and 512, respectively. For one building, it is possible to configure the right wall and the left wall as separate frames, respectively, and transmit the same. FIG. 5B illustrates that a part of the image, rather than the entire image, may be transmitted in one frame.

Referring to FIG. 5C, in the first frame 521, a specific user pose, for example, the building image corresponding to the first pose described in FIG. 4A, may be transmitted, and in the second frame 522, another user pose, for example, the building image corresponding to the third pose described in FIG. 4C may be transmitted. In addition, in FIG. 5C, when one frame is configured, a downsized image may be transmitted in one frame. That is, the size of each of the frames 521 and 522 of FIG. 5C may be smaller than that of the frame of the reference numeral 501 of FIG. 5A.

FIG. 5D illustrates a case where multiple images are packed into one image in one frame and transmitted. Referring to FIG. 5D, in a specific region 531 in one frame, an image corresponding to a left wall of the building is configured, in another region 532, an image obtained through reduction of the first frame illustrated in FIG. 5C is configured, and in the remaining specific region 533, an image obtained through reduction of the second frame illustrated in FIG. 5C is configured. It is illustrated in FIG. 5D that two or more images may be simultaneously transmitted in one frame, and an image to be transmitted can be downsized and transmitted. When the rendered images are packed into one frame, in order to increase the details, the size of each image may be smaller or larger than the original size according to the weight or the original size.

In addition, as described above, the weight of an image may be determined based on information provided to the server 100 by a content provider or a content creator creating a content, and such determination may be made by the instruction processor 101 described in FIG. 2 above.

FIG. 6A illustrates a frame transmission timing for describing an effect of a case of using a pre-registered image according to various embodiments of the present disclosure, and FIG. 6B illustrates a frame transmission timing for describing an effect of a case of using a pre-registered image according to various embodiments of the present disclosure.

Referring to FIG. 6A, normally a frame may be transmitted. Accordingly, when the server 100 provides a specific content to the user equipment 200 and a first frame (Frame #1) 601 is transmitted, metadata 611 corresponding to the first frame may be transmitted. In addition, when transmitting a second frame (Frame #2) 602, the server 100 may transmit metadata 612 corresponding to the second frame may be transmitted together. Accordingly, when the server 100 transmits an nth frame (Frame #n) 60n to the user equipment 200, metadata 61n corresponding to the nth frame may be transmitted.

FIG. 6A illustrates that an image of a building is located in a frame, and a transform of the building is not considered. If pose information is continuously updated as the user moves, frames 601, 602, ..., and 60n are transmitted while information on the change in the building is included as the user moves, as described in FIGS. 4A to 4C above.

FIG. 6B illustrates a case of using a pre-registered image according to the disclosure. For example, as described above, when there is no movement of the user for a predetermined time, or where there is pre-registered data, a frame may be transmitted.

Referring to FIG. 6B, when the server 100 provides a specific content to the user equipment 200 and transmits a first frame (Frame #1) 601, metadata 611 corresponding to the first frame may be transmitted. In addition, when transmitting a second frame (Frame #2) 602, the server 100 may transmit metadata 612 corresponding to the second frame together. However, in FIG. 6B according to the disclosure, the second frame (Frame #2) 602 may be configured to include dummy data. In this case, the second frame (Frame #2) 602 may be identical to the first frame, or a pre-registered image may be used. For example, it may be assumed that server instruction information is configured so that the server 100 stores the first frame (Frame #1) 601 while transmitting the first frame (Frame #1) 601. In this case, when there is no pose change, server instruction information indicating that dummy data is included instead of transmission of the second frame (Frame #2) 602 and the metadata 622 corresponding to the second frame reuses the pre-registered image is configured.

When there is no pose change until a specific time point, for example, when there is no pose change of the user until the nth frame, an instruction instructing that the nth frame (Frame #n) 60n transmitted by the server 100 includes the dummy data and is transmitted may be made, and an instruction instructing reuse of a specific frame may be made to the metadata 62n corresponding to the nth frame.

In another example, it may be assumed that a pre-registered frame is used after the server 100 transmits the first frame (Frame #1) 601. For example, when the building of FIG. 4A is transmitted in the first frame (Frame #1) 601 and an image corresponding to the second pose 420 is pre-registered as a pre-registered frame, the server 100 may provide server instruction information instructing to include the dummy data instead of transmitting the second frame (Frame #2) 602, and to reuse the pre-registered image by the metadata 622 corresponding to the second frame. Thereafter, when the user maintains the same pose as that of the second frame until the nth frame, an instruction instructing to transmit the nth frame (Frame #n) 60n by including the dummy data therein may be made, and an instruction instructing to reuse a specific frame may be made to the metadata 62n corresponding to the nth frame.

In addition, the dummy data according to an embodiment of the disclosure may have a compressed form of a specific image. The specific image is transmitted in the compressed form because the media stream decoder 212 of the user equipment 200 is normally configured to decode consecutive media streams and failure of reception of data in a specific frame may be thus determined as an error. Accordingly, to prevent this error, configuration of transmission of a specific compressed image can prevent the media stream decoder 212 of the user equipment 200 from recognizing the failure as an error.

In another embodiment according to the disclosure, the dummy data may be implemented as a single image frame having the least information, such as a screen completely identical to the previous frame, a full black screen, or a full white screen. The configuration of the dummy data with a screen based on a specific color is also to prevent failure of reception of data in a specific frame from being determined as an error because of the fact that the media stream decoder 212 of the user equipment 200 normally decodes consecutive media streams.

Accordingly, in a specific case, for example, in a case where server instruction information can be transmitted first and the instruction processor 211 may allow the media stream decoder 212 to stop image decoding in a specific frame, or instruct not to detect an error during the image decoding, it is also possible not to configure the transmission of the dummy data itself.

When the received server instruction information includes a reuse instruction, the instruction processor 211 of the user equipment 200 may instruct to output a pre-registered image from the third database 214 to the transformer 215 while instructing the transformer 215 to ignore the image decoded by the media stream decoder and to perform transform to provide the image received from the third database 214 to the user.

Accordingly, the transformer 215 may transform the image pre-registered in the third database 214 into an image to be provided to the user, and store the same in the display buffer 216.

In addition, such information may be an image based on a pose estimated in the server 100, based on the user pose information included in the user instruction information provided to the server 100 by the user equipment 200. That is, the server 100 selects the pre-registered image, based on the estimated pose, and thus, the server instruction information may include the estimated pose information. Accordingly, the instruction processor of the user equipment 200 may compare the user pose received from the sensor 213 with the pose information estimated by the server 100. In addition, when the user equipment 200 can change a part of an image, a part of the pre-registered image may be corrected based on a difference between the estimated pose provided by the server 100 and the pose information most recently received from the sensor 213. That is, the instruction processor 211 may instruct transform of the pre-registered image according to the pose information most recently received from the sensor 213, and the transformer 215 may partially transform the image obtained from the third database 214, based on the instruction of the instruction processor 211 and output the same to the display buffer 216.

When the instruction processor 211 of the user equipment 200 instructs the transformer 215 to transform the image and there is a difference that is big enough, obtained through comparison of the pose most recently received from the sensor 213 with the pose of the pre-registered image and the pose estimated by the server 100, values of poses of other images pre-stored in the third database 214 and values of estimated poses may be additionally compared. When a difference between the values of the poses of other images and the values of the poses estimated by the server is compared and there is at least one image having the difference within a transformable range, the instruction processor 211 may select an image having the smallest difference from among the at least one image. Thereafter, the instruction processor 211 may provide the selected image from the third database 214 to the transformer 215 to instruct the transformer to transform the image into an image to be provided to the user.

In addition, the user equipment 200 may transform the image, based on the server instruction information from the server 100, and may report information on the image to be provided to the user to the server 100 again. For example, as described above, there is a difference from the pose information estimated by the server 100 within a threshold value, information on the difference may be provided as instruction information. In another example, when there is a large difference between the pose information estimated by the server 100 and the final user pose information obtained from the sensor 213, information on an image used from among the pre-registered images may be provided to the server 100. Such information may be generated as device instruction information and transmitted and, accordingly, the information above may be included when the user instruction information is generated by the instruction processor 211.

When the information on the image used from among the pre-registered images is received from the user equipment 200 as the user instruction information, the server 100 may obtain information on a difference from the pose, among the user information, and allow, based on the information, the pose estimator 102 to additionally use the information for estimation of a user pose. Accordingly, the accuracy of the pose estimator 102 can be increased.

Figure 7:
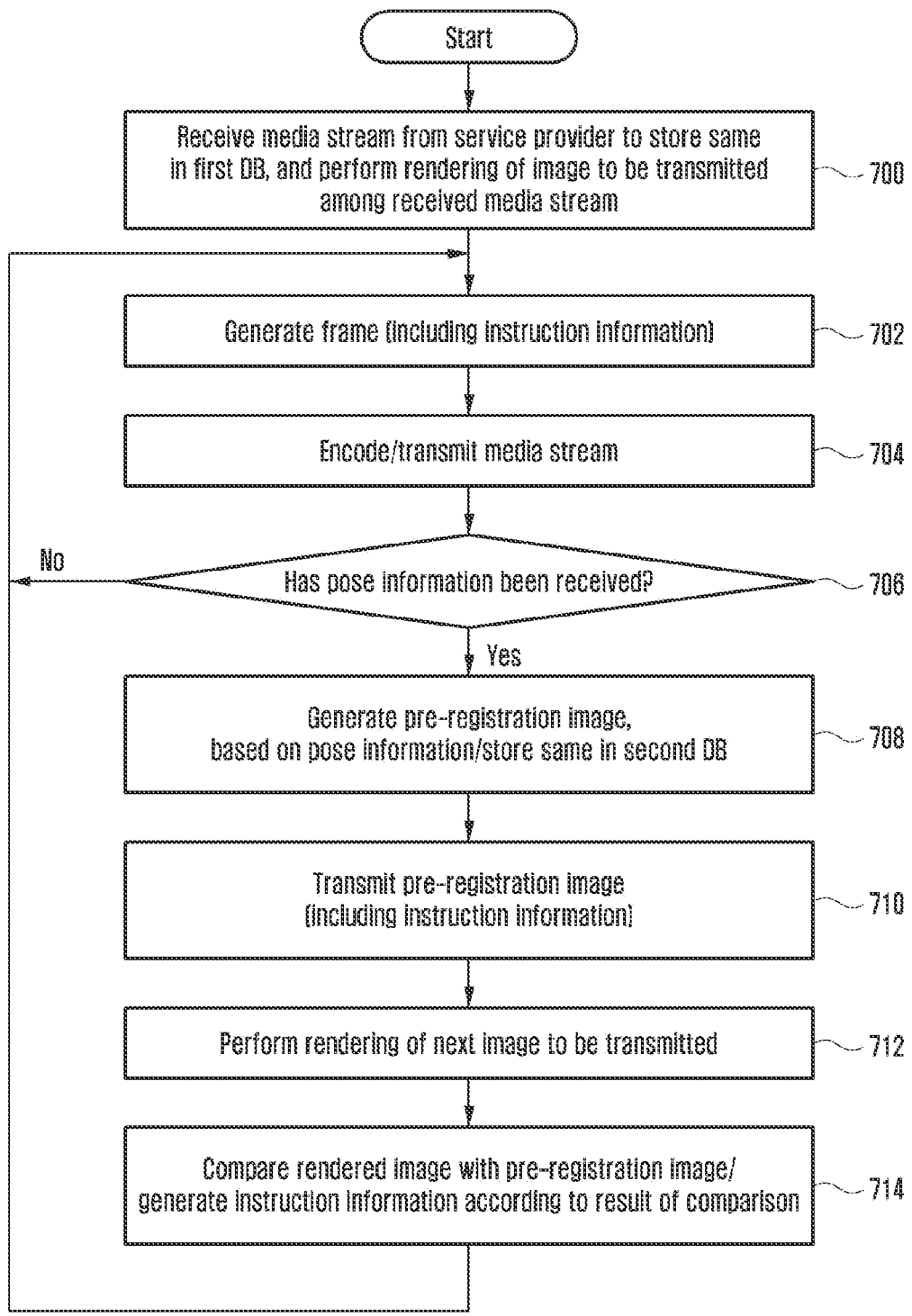
FIG. 7 is a flowchart illustrating a case of providing a content to a user equipment by a server according to various embodiments of the present disclosure.

FIG. 7 is a flowchart illustrating a case of providing a content to a user equipment by a server according to various embodiments of the present disclosure.

Referring to FIG. 7, in operation 700, the server 100 may receive a content on a media stream from a content provider, for example, the 5GMS application provider 30 of FIG. 1A, and store the content in a first database 140. In addition, for the content stored in the first database 140, service may be provided to a specific user. For example, when a request for service is received from a specific user equipment, the server 100 may extract the content stored in the first database 140 as an image to be transmitted through a media stream, and render the image, in operation 700. Such rendering may be performed by a renderer 121.

Although not shown in FIG. 7, when dividing operation 700 in more detailed operations, the server 100 may perform a procedure of authentication, etc. when initiation of service for the content is requested from a specific user equipment 200. Thereafter, in response to the content to be provided to the authenticated user equipment, capability information of the user equipment may be received. For example, video processing capacity of the user equipment, memory storage capacity information, and/or information on capability of data processing with a data transmission network, etc. may be included.

In addition, although not shown, for a specific content, the server 100 may generate a pre-registered image in advance, based on information (e.g., metadata) provided from a content provider and/or a content creator, and store the same in a second database 133.

Thereafter, in operation 702, the rendered image is provided to a frame generator 122. In addition, the instruction processor 101 may instruct frame generation. In this case, the instruction processor 101 may include instruction information relating to an image included in a frame to be transmitted. Such instruction information may be configured as the server instruction information described in FIG. 2 above. In addition, the instruction information may be configured so that one frame to be transmitted includes multiple images as shown in FIGS. 5A to 5D above. When one frame includes one image, a partial image in a specific area, or two or more images, the instruction processor 101 may additionally provide another server instruction information. In addition, the instruction processor 101 may generate instruction information to which a field requesting pose information from the user equipment 200 is added, and provide the same to the frame generator 122.

In operation 702, the frame generator 122 may configure one frame to be transmitted, by using at least one rendered image received from the renderer 121 and the server instruction information provided from the instruction processor 101. Once the generation of one frame is completed, the frame generator 122 may transfer the frame to a media stream encoder 123.

In operation 704, the media stream encoder 123 may encode a media stream and transmit the same through a network 10. In operation 704, as described in FIG. 2 above, additional transform through a network interface for connection with the network in the server 100 may be performed.

In operation 706, the instruction processor 101 of the server 100 may inspect whether the user pose information is received through the user instruction information from the user equipment 200. When the user pose information is received, operation 708 is performed, and when the user pose information is not received, operation 702 is performed, so as to perform additional image transmission.

In operation 708, the user instruction information includes the pose information, the instruction processor 101 may extract the pose information and provide the same to the pose estimator 102. The pose estimator 102 may estimate a user pose later, based on the user pose information. Such estimation may be possible when the pose information is received at least two or more times. Accordingly, operation 706 is followed by operation 708 when the user pose information is received a pre-configured times.

In operation 708, the pose estimator 102 may generate an image after a specific time point, that is, at a time point at which a specific frame is transmitted, based on the user pose information. When such image is transmitted in advance, the image may be a pre-registered image. As described above, the pre-registered image may be stored in the second database 133 as image-pose pair information.

In addition, in operation 710, after the pre-registered image is rendered by the renderer 121, the pre-registered image may be transmitted in the same manner described in FIG. 5D. An operation of transmitting the pre-registered image may be performed in the same manner described above, and the server instruction information thereof may be additionally configured and transmitted.

Thereafter, in operation 712, the renderer 121 may obtain the next image transmitted, from the first database 140, and perform rendering. After rendering of the next image to be transmitted, an image comparator 131 may compare, in operation 714, the next image with the pre-registered image stored in the second database 133, and provide a result of the comparison to the instruction processor 101. Accordingly, the instruction processor 101 may determine whether to use the pre-registered image without any change, use the same in the future, or use the same through a small change. Upon such determination, the instruction processor 101 may generate server instruction information and provide a frame generation signal to the frame generator 122 together with the server instruction information.

When the pre-stored image is used, as described above, a bandwidth can be saved, and proper service can be provided in a case where latency is high or a transmission rate is low as well as a case of a user equipment not capable of reprocessing of an image.

In FIG. 7, a scheme according to one embodiment according to the disclosure has been described. Although not described in FIG. 7, embodiments described in other drawings may be also applied to the disclosure.

Figure 8:
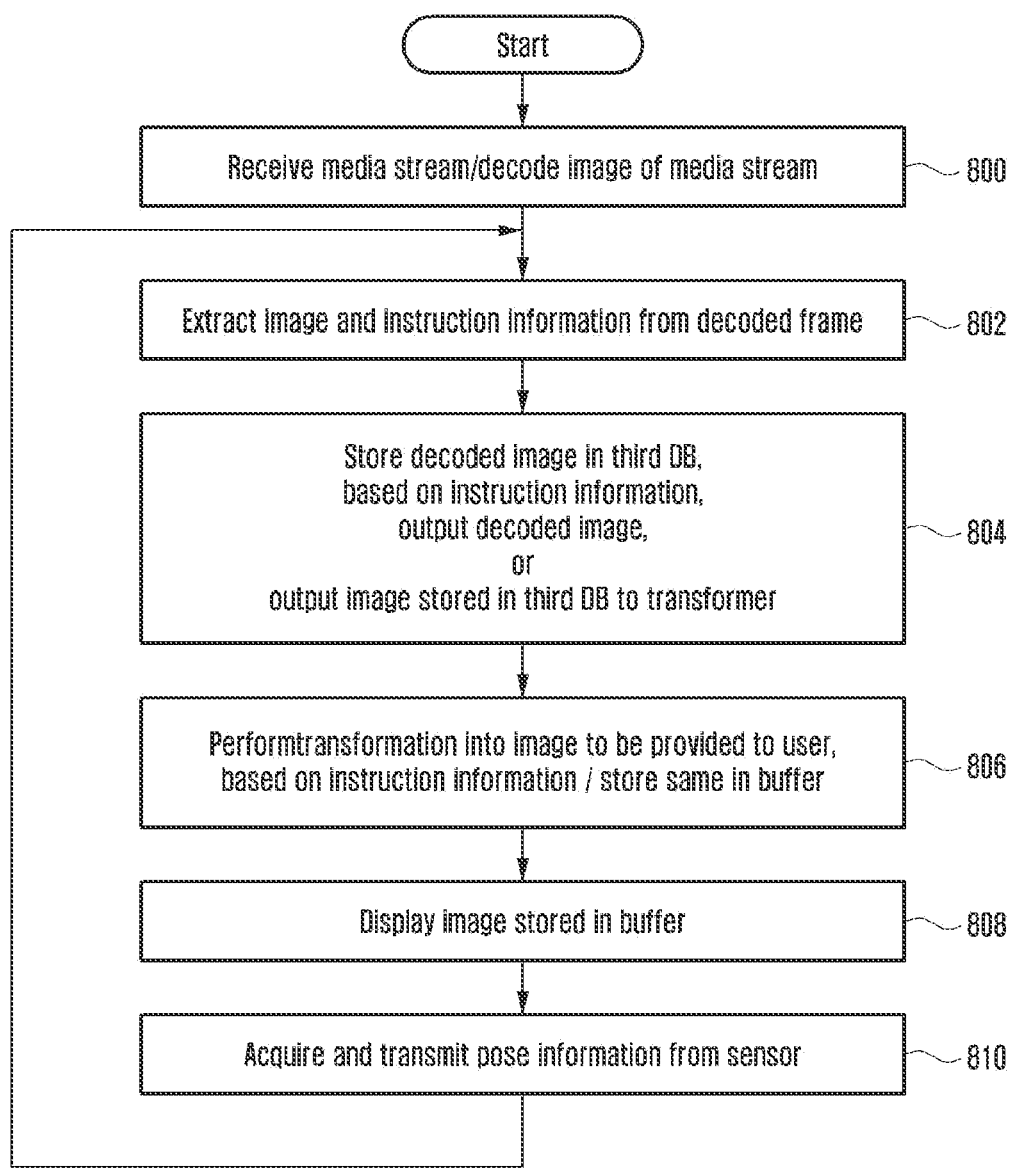
FIG. 8 is a flowchart illustrating a case of receiving content data from a user equipment according to various embodiments of the present disclosure.

FIG. 8 is a flowchart illustrating a case of receiving content data from a user equipment according to various embodiments of the present disclosure.

Referring to FIG. 8, in operation 800, a media stream decoder 212 of a user equipment 200 may receive and decode a media stream. In addition, in operation 802, an instruction processor 211 may acquire a decoded image and server instruction information provided from the media stream decoder. If the server instruction information instructs pre-registration of the decoded image, the instruction processor 211 may perform control registration of the decoded image in the third database 214 in operation 804. In another example, the instruction processor 211 may output the decoded image to a transformer 215 to allow the transformer to transform the decoded image into an image to be provided to a user. In another example, the instruction processor may instruct registration of the decoded image in the third database 214 while simultaneously instructing the output of the decoded image to the transformer 215 so as to be provided to the user.

In operation 804, when the received image is stored, the image corresponds to a pre-registered image. This case may include a case where a pre-registered image is transmitted in advance at a service initiation time point as described in FIG. 2 above.

In addition, in operation 804, when an instruction is made such that the decoded image is displayed to the user while the decode image is registered in the third database, a specific image may be frequently used, and this case may correspond to a case where an instruction instructing displaying of the corresponding image is made while an instruction instructing the pre-registration is simultaneously made.

In addition, in operation 804, when the decoded image is output to the transformer 215 so as to be provided to the user, the use frequency of the decoded image may be low and the decoded image may not correspond to a pre-registered image.

Thereafter, in operation 806, the transformer 215 may transform, without any change or through a small change, one of the images received from the third database 214 or the images decoded by the media stream decoder into an image to be provided to the user, based on information provided from the instruction processor 211. The transformed image may be stored in a display buffer 216.

When a time point of providing the stored image arrives, the display buffer 216 may display, in operation 808, the image stored in the buffer on a display 217, so as to provide the corresponding image to the user. In case of consecutive images, consecutive image frames may be provided to the user within a pre-configured time, so that the consecutive images can be provided. Accordingly, the image displayed after the buffering in the buffer 216 may be provided at 24 frames per second, or above.

When service is continuously provided, the sensor 213 may obtain user pose information at regular time intervals or at irregular time intervals. The case where the regular time intervals are used corresponds to a case where there is no drastic movement of the user, and this may be configured according to the characteristics of the content. In another example, in the case where there is a drastic movement of the user, a user pose may change fast if a specific content provides a specific frame. In this case, the user pose needs to be detected faster than a normal case.

Based on the information above, the sensor 213 continuously provides the user pose information to the instruction processor 211. Accordingly, the instruction processor 211 may obtain, in operation 810, the user pose information from the sensor, and transmit the user instruction information by including the user pose information thereto.

In addition, as described above, when the pre-registered image is used when a specific image frame is provided to the user, the instruction processor 211 may provide the corresponding image information. In this case, when the image is used through modification, information on the modification is additionally generated as user instruction information so as to be provided to the server 100.

Figure 9:
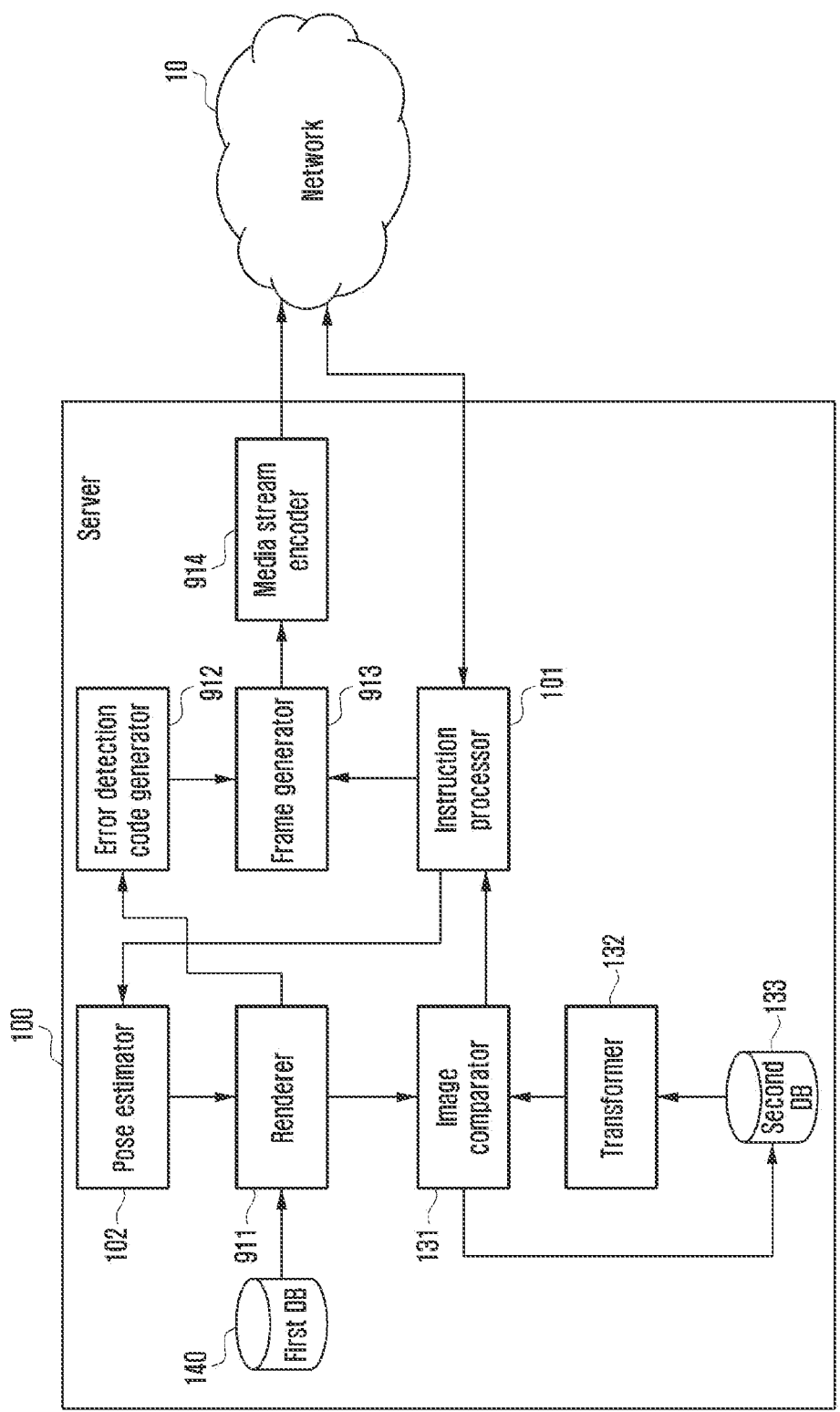
FIG. 9 is a block diagram illustrating a case of implanting a server according to a second embodiment of the present disclosure.

FIG. 9 is a block diagram illustrating a case of implanting a server according to a second embodiment of the present disclosure.

FIG. 9 illustrates that a partial configuration is added to and modified from the configuration of FIG. 2. Accordingly, a description of the same configuration and operation as those of FIG. 2 will be simply made or omitted.

Referring to FIG. 9, compared to FIG. 2, an error detection code generator 912 may be additionally configured. Accordingly, an output of a renderer 911 is not input to a frame generator 913 and is input to the error detection code generator 912. The renderer 911 may obtain an image to transmitted, corresponding to the content, from the first database 140 as described in FIG. 2, and render the image, and provide the rendered image to the error detection code generator 912. In this case, the renderer 911 may use pose information estimated from the pose estimator 102.

When the rendered image generated from the renderer 911 is input to the error detection code generator 912, the error detection code generator may generate an error detection code corresponding to the image. The error detection code generator 912 is additional configured because a network between the server 100 and the user equipment 200 corresponds to a network in which an error or a loss may occur, and an error or a loss on a transport protocol may occur.

The generation of an error detection code will be described with reference to FIG. 11.

Figure 11:
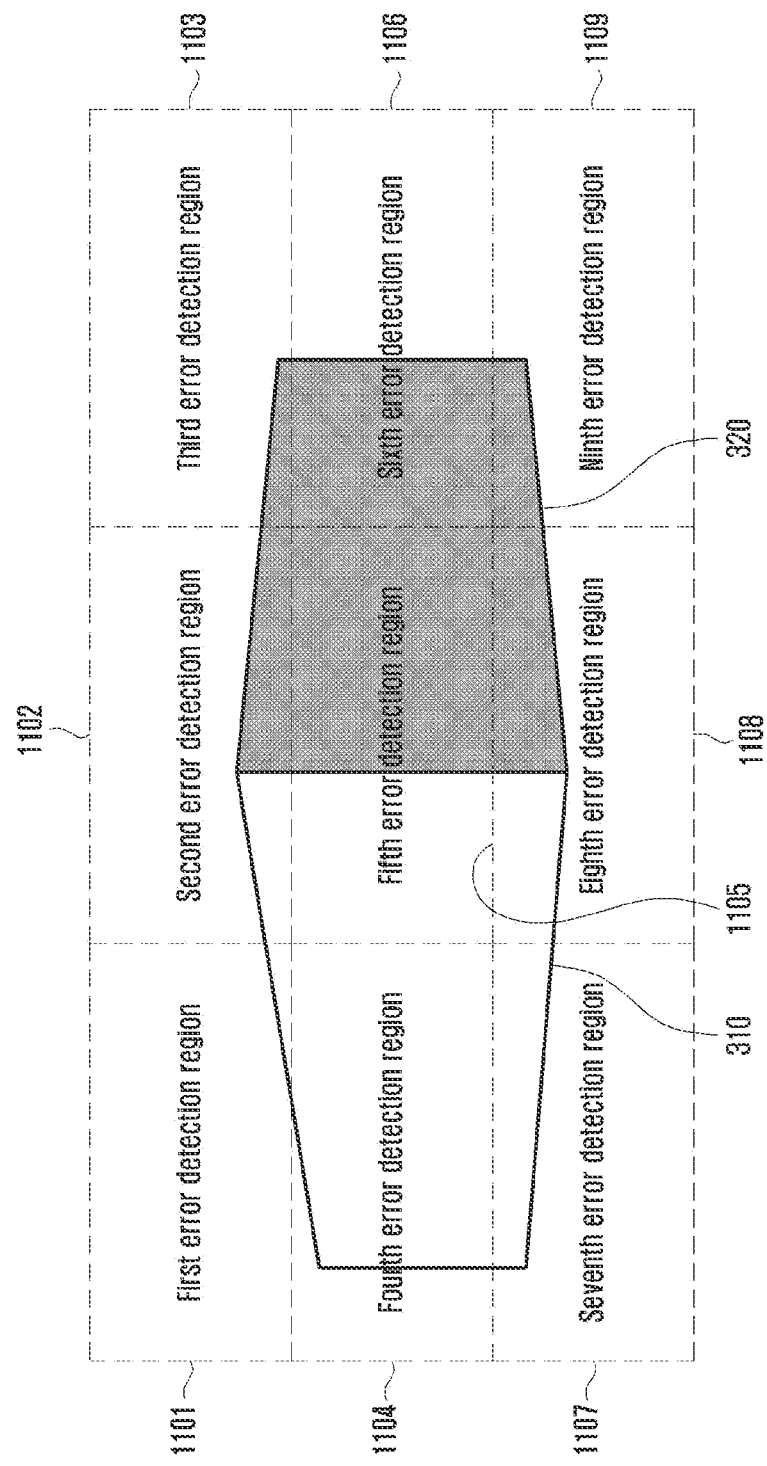
FIG. 11 illustrates a case where error detection regions of a rendered image are classified according to various embodiments of the present disclosure.

FIG. 11 illustrates a case where error detection regions of a rendered image are classified according to various embodiments of the present disclosure.

FIG. 11 illustrates a case where error detection regions are classified using an image of the building 300 described in FIG. 4A above. The building 300 may include a left wall 310 and a right wall 320. In addition, in the disclosure, a region constituting one frame is divided into nine uniform error detection regions 1101, 1102, 1103, 1104, 1105, 1106, 1107, 1108, and 1109. FIG. 11 merely shows an example, and one frame may be divided into more or less error detection regions.

In addition, in FIG. 11, each of the error detection regions is configured to have a uniform size in both a case where the building is included in all regions and a case where the building is disposed in only some error detection regions. However, according to an image processing technique, when size information of each error detection region may be configured to be separately transmitted, an error detection region in which the building is located, among the error detection regions, may be distinguished as an error detection region having a small size, so that implementation can be made to facilitate error detection and correction. For example, error detection region #5 1105 may be implemented to have nine additional error detection regions.

Further division into additional error detection regions may be configured so that an error detection region is additionally divided when specific image data occupies 50% or more of the error detection region.

As illustrated in FIG. 11, when one frame is divided into nine error detection regions, implementation may be made such that a code for error detection is generated for each error detection region, and the code is transmitted to the rendered image as additional information.

Referring back to FIG. 9, the error detection code generator 912 may divide the rendered image into pre-configured regions and generate a code for error verification for each region. An error verification code generated corresponding to each error detection region may be configured to be transmitted to the rendered image as additional information. The code capable of verifying an error is called an "error verification code" in the description below. In relation to a transmission channel of the error verification code, the error verification code may be transmitted using the same channel as a channel through the rendered image is transmitted. In another example, in relation to a transmission channel of the error verification code, the error verification code may be a separate channel different from that for the rendered image. In addition, in relation to a transmission period of the error verification code, the error verification code may be transmitted for each frame of the rendered image, transmitted for each error verification region classified in one frame as shown in FIG. 11, or transmitted upon a request from the user equipment 200.

The error detection region may follow a video coding structure such as a macro block, a slice, and a tile, or may be separately configured for a region including a part determined as meaningful in one video frame, for example, a part such as a face of a human object.

Examples of information of the error detection region may be as follows in <Table 11> below.

TABLE 11

| | |
|---|---|
| num_error_region for num_error_region: | Number of error regions in frame |
| error_region_type | 0 macro block, 1 slice, 2 tile, 3 mosaic, 4 arbitrary region, 5 reserved |
| error_region_id | Follow sequence in frame for types 0, 1, and 2, and types 3 and 4 are identification numbers |
| has_region_xywh | Flag indicating whether there is error_region_xywh |
| if has_region_xywh == True: | |
| error_region_xywh | Specify location and size |
| error_detection_method_type | Scheme URI |
| error_detection_code_size | error_detection_code value field size |
| error_detection_code | Value returning when error_detection_method_type is applied for error_region |
| has_rendered_image_metadata if has_rendered_image_metadata == True: | Whether there is metadata |
| rendered_image_metadata | Metadata describing rendered image |

The output of the error detection code generator including such information above is made to the frame generator 913. Accordingly, the frame generator 913 may generate and output a frame by including server instruction information, based on the instruction of the instruction processor 101. Thereafter, the media stream encoder 914 may encode an image frame including the error detection code and transmit the same to the user equipment 200 through a network 10.

Figure 10:
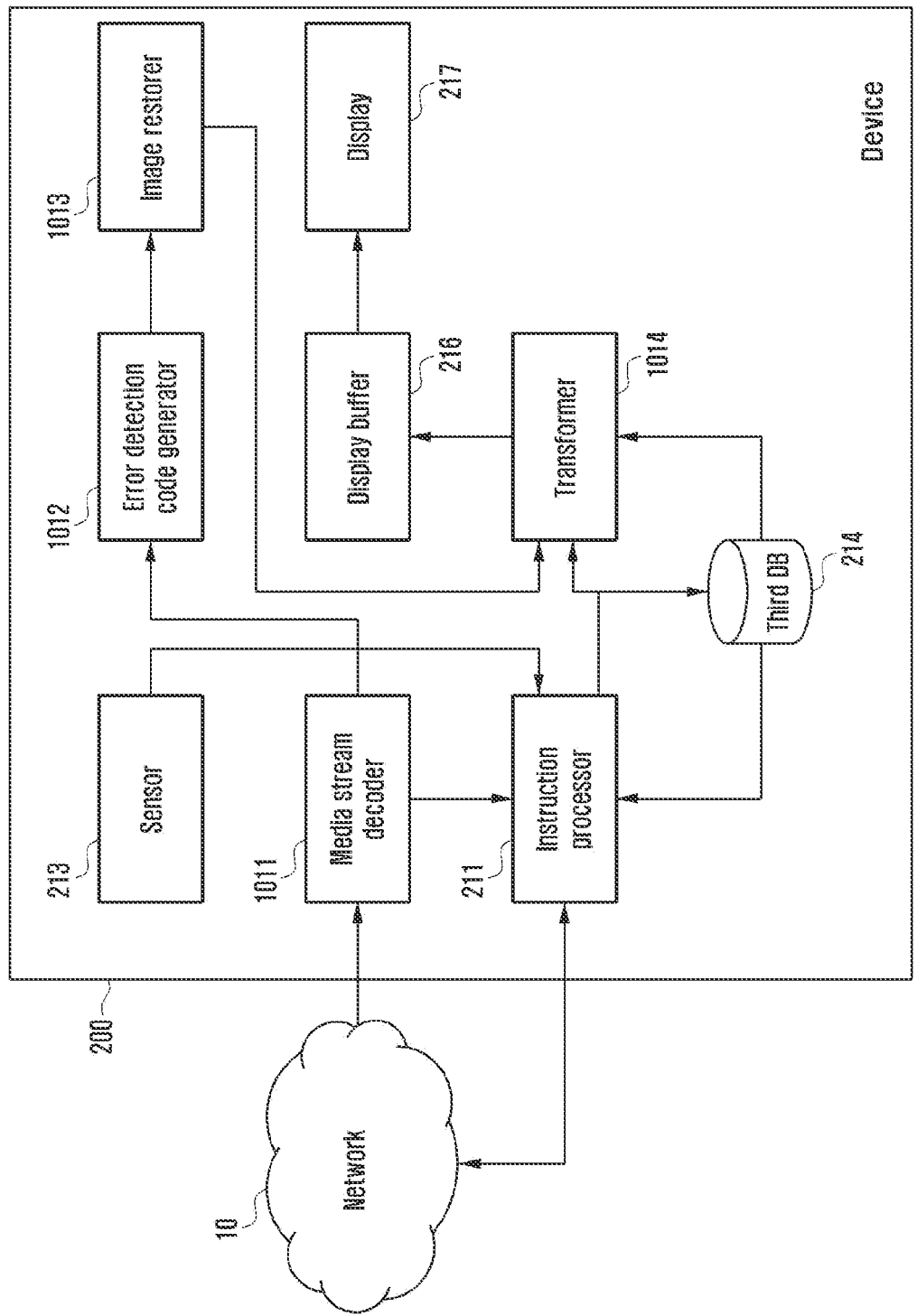
FIG. 10 is a block diagram illustrating a case of implementing a user equipment according to a second embodiment of the present disclosure.

FIG. 10 is a block diagram illustrating a case of implementing a user equipment according to a second embodiment of the present disclosure.

FIG. 10 is a configuration of a user equipment corresponding to the server apparatus of FIG. 9, and a partial configuration may be added to and modified from the configuration of FIG. 3.

Referring to FIG. 10, the following difference exists compared to the configuration of FIG. 3.

In the embodiment of FIG. 3, after the received media frame is decoded, the frame is output to the transformer while being simultaneously output to the instruction processor 211, but in the second embodiment of FIG. 10, a media stream decoder 1011 outputs the decoded frame to an error detection code generator 1012 without outputting the same to a transformer 1014. In this case, the media stream decoder 1011 may identify whether the received frame includes error detection region information. If the error detection region information is included, while the decoded frame is output to the error detection code generator 1012, error detection region information and information included in the error detection region information may be provided to the error detection code generator 1012.

The error detection code generator 1012 may extract decoded image data and region information described the error detection region information, and verify each region in a scheme specified in an error detection method type (error_detection_method_type) so as to calculate an error detection code.

Where there is inconsistency between the calculated error detection code and an error detection code (error_detection_code) in the error recovery information (error_detection_region_information) provided from the server as in <Table 11>, the error detection code generator 1012 may determine whether the data received from the server 100 includes an error in a transmission path and/or in the process of reception.

In addition, in addition to a true/false value such as consistency or inconsistency, a signal to noise ratio calculation method such as a peak signal to noise ratio (PSNR) may be used to provide the degree of a definition loss through comparison between the received image and a part of the pre-registered image. The server 100 designates the whole or a part of the pre-registered image to be used for error recovery, among information for error recovery, for each error detection region, and thus, when during the PSNR comparison between the image to be transmitted and the pre-registered image in the second database, a predetermined value is returned as the similarity between two images. The server 100 may provide, to the user equipment 200, a value of the PSNR comparison with a part of the pre-registered image for each error detection region, and when it is determined that an error has occurred in the error detection region of the received image, the user equipment 200 may obtain a value of the PSNR comparison with the pre-registered image instructed by the server 100 and determine whether to perform error recovery if the obtained value is within a predetermined threshold value range, compared to the PSNR comparison value provided by the server 100.

When the error detection code generator 1012 determines that an error at a predetermined level or lower has occurred, the error detection code generator 1012 may determine to use the decoded image without any change. A level value of the error at the predetermined level or lower may be determined for each user equipment 200, or may be a value provided by the server 100 in advance. In this case, the error detection code generator 1012 may instruct an image restorer 1013 to use the image without any change.

If there is no error in the mage, or if an error at a predetermined level or lower has occurred but an instruction is made to use the image without any change even though the error exists, the image restorer 1013 may provide the decoded image to the transformer 1014 without special processing.

On the other hand, as a result of an inspection in the error detection code generator 1012, an error has occurred and the error needs to be recovered, the error detection code generator 1012 may instruct recovery of an error part by using the pre-registered image in the third database 214. FIG. 10 does not illustrate a line for a connection between the image restorer 1013 and the third database 214, but for such processing, there is a path for transmission or reception of a control signal and data between the image restorer 1013 and the third database 214. In addition, when error recovery is performed, the server 100 has information on the images pre-registered by the user equipment 200, and thus, the server may provide information on an image to be used for recovery in advance. This may be instructed based on image-pose pair information.

Accordingly, the image restorer 1013 may extract an image of the corresponding region, from the pre-registered image, and replace, with the extracted image, the image region in which the error has occurred, so as to restore the image. For example, in the case of FIG. 11, when an error has occurred in the fifth error detection region (error detection region #5) 1105, an image in the corresponding region may be extracted from the pre-stored image corresponding to the error, so that restoration is performed.

In addition, the server 100 may separately instruct a method for using the pre-registered image, through the error recovery information received in the user equipment 200. Such instruction may be also provided together as server instruction information. In addition, the image restorer 1013 may obtain an optimal image from among images stored in the third database 214 through comparison of images based on image-pose pair information stored in the third database 214 with estimation image information provided by the server 100, based on the image-pose pair information. In this case, the most recent pose information of the user, received from the sensor 213, may be also additionally utilized. When there is a difference between the estimated user pose information provided by the server 100 and the most recent pose information received from the sensor 213, the image restorer 1013 may restore an image in consideration of the difference. That is, during the image restoration, the image may be transformed in consideration of the difference in poses, and the transformed image may be used as a replacement and may be inserted into the corresponding region in which the error has occurred.

In addition, when a transformed image is used as a replacement and is inserted into a specific region of the image in which the error has occurred, the image restorer 1013 may additionally apply additional processing, for example, a spatial or visual smoothing technique, so as to perform fusion in a more seamless manner.

According to the second embodiment described above, even when an error in a content image transmitted between the server 100 and the user equipment 200 has occurred, the error may be detected and may be properly corrected. This may be performed without latency in image retransmission by using the pre-registered image, and the pre-registered image may be reused in various ways, which is thus advantageous in that usability of a bandwidth can be increased.

In addition, various example embodiments disclosed in the specification and drawings merely suggest specific examples so as to easily explain the content of the disclosure and help the understanding of the disclosure, and do not intend to limit the disclosure. Accordingly, it should be understood that in addition to the embodiments disclosed herein, all modifications or changes derived based on the technical spirit of the disclosure fall within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a server for providing a media stream, the method comprising:
   receiving, from a content provider, the media stream for a user equipment (UE), and storing the media stream;
   rendering an image of the stored media stream;
   generating a first frame including the rendered image and instruction information associated with the rendered image;
   encoding the first frame; and
   transmitting, to the UE, the encoded first frame through a network,
   wherein the instruction information instructs the UE to perform at least one of storing a report of the image, reusing a report of the image, requesting a report of the image, requesting an update of a pre-stored image, or deleting a pre-registered image, and
   wherein the instruction information instructs the UE to store an image that is to be used for generating another image when the UE receives dummy data from the server.

2. The method of claim 1, further comprising:
   determining, based on metadata of the media stream, a representative pose corresponding to each pose;
   rendering a first image of the representative pose corresponding to each pose;
   generating a second frame including the rendered first image of the representative pose and the instruction information;
   encoding the second frame; and
   transmitting, to the UE, the encoded second frame via the network.

3. The method of claim 2, further comprising:
   estimating, based on pose information of a user, a user pose after a predetermined time wherein the pose information of the user is received from the UE;
   rendering a second image to be pre-registered based on the estimated user pose; and
   transmitting, to the UE, the rendered second image to be pre-registered and the instruction information.

4. The method of claim 3, further comprising:
   mapping the second image to the estimated user pose as image-pose pair information; and
   storing the image-pose information into a database.

5. The method of claim 3, further comprising adding an error detection code to the rendered second image.

6. The method of claim 5, further comprising:
   dividing the rendered second image into a predetermined number of regions; and
   adding the error detection code to each of the divided second image.

7. The method of claim 3, wherein the pose information includes at least one of a rotation angle, a rotation amount, information on a motion, a rotation speed, or movement information based on a movement of the user.

8. The method of claim 2, further comprising:
   storing the rendered image and the rendered first image of the representative pose corresponding to each pose;
   comparing the stored rendered image with the rendered first image to generate a value representing a similarity between the stored rendered image and the rendered first image;
   when the value is greater than or equal to a predetermined value and the instruction information is configured to instruct the UE to store the stored rendered image, configuring a reuse of the image; and
   transmitting, to the UE, the instruction information and the dummy data.

9. The method of claim 8, wherein the dummy data is configured as an image frame including at least one of a compressed form of a specific image, a same data as a previous frame, a form of a full black screen, or a form of a full white screen.

10. A server for providing a media stream, the server comprising:
    a database configured to store, based on a mapping rule, a rendered image and content of the media stream received from a content provider for a user equipment (UE);
    a media stream encoder configured to encode the content of the media stream to transmit, to the UE, through a network; and
    at least one hardware processor operably coupled to the database and the media stream encoder, the at least one hardware processor configured to:
    control a renderer to render an image of the media stream stored in the database;
    control an instruction processor to generate instruction information for the rendered image; and
    control a frame generator to generate a first frame including the rendered image and the instruction information,
    wherein the instruction information instructs the UE to perform at least one of storing a report of the image, reusing a report of the image, requesting a report of the image, requesting an update of a pre-stored image, or deleting a pre-registered image, and
    wherein the instruction information instructs the UE to store an image that is to be used for generating another image when the UE receives dummy data from the server.

11. The server of claim 10, wherein the at least one hardware processor is further configured to:
    determine, using metadata of content of the media stream, a representative pose corresponding to each pose;
    render a first image of the representative pose corresponding to each pose through the renderer;
    control the frame generator to generate a second frame including the rendered first image of the representative pose and the instruction information;
    control the media stream encoder to encode the second frame; and transmit, to the UE, the encoded second frame via the network.

12. The server of claim 11, wherein the at least one hardware processor is further configured to:
control a pose estimator to estimate, based on pose information of a user, a user pose after a predetermined time, the pose information of the user received from the UE,
control the renders to render a second image to be pre-registered based on the estimated user pose; and
transmit, to the UE, the rendered second image to be pre-registered and the instruction information.

13. The server of claim 12, wherein the at least one hardware processor is further configured to:
map the second image to the estimated user pose as image-pose pair information; and store the image-pose information into the database.

14. The server of claim 12, wherein the at least one hardware processor is further configured to control an error detection code generator to add an error detection code to the rendered second image.

15. The server of claim 14, wherein the error detection code generator is further configured to:
divide the rendered second image into a predetermined number of regions; and
add the error detection code to each of the divided second images.

16. The server of claim 12, wherein the pose information includes at least one of a rotation angle, a rotation amount, information on a motion, a rotation speed, or movement information based on a movement of the user.

17. The server of claim 11, wherein:
the at least one hardware processor is further configured to:
store the rendered image and the rendered first image of the representative pose corresponding to each pose;
control a comparator to:
compare the stored rendered image with the rendered first image to generate a value representing a similarity between the stored rendered image and the rendered first image, and
when the value is greater than or equal to a predetermined value and the instruction information is configured to instruct the UE to store the stored rendered image, configure a reuse of the image; and
transmit, to the UE, the instruction information and the dummy data.

18. The server of claim 17, wherein the dummy data is configured as an image frame including at least one of a compressed form of a specific image, a same data as a previous frame, a form of a full black screen, or a form of a full white screen.

* * * * *